(12) United States Patent
Akatsu et al.

(10) Patent No.: US 6,496,862 B1
(45) Date of Patent: Dec. 17, 2002

(54) REMOTE MONITORING AND CONTROL OF DEVICES CONNECTED TO AN IEEE 1394 BUS VIA A GATEWAY DEVICE

(75) Inventors: Shinji Akatsu, Kanagawa (JP); Fernando Masami Matsubara, Santa Clara, CA (US); Shin Miura, Kanagawa (JP)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 09/304,213

(22) Filed: Apr. 29, 1999

Related U.S. Application Data

(63) Continuation of application No. 09/144,678, filed on Aug. 31, 1998, now abandoned, and a continuation of application No. 09/140,899, filed on Aug. 25, 1998, now abandoned.

(51) Int. Cl.[7] .............................................. G06F 15/16
(52) U.S. Cl. ...................... 709/224; 709/245; 709/246; 709/249; 709/223
(58) Field of Search ............................... 370/474, 475; 709/245, 238, 246, 249, 227, 221, 222, 223, 224; 725/20

(56) References Cited

U.S. PATENT DOCUMENTS

| | | | |
|---|---|---|---|
| 4,423,414 A | 12/1983 | Bryant et al. | 340/825.07 |
| 4,644,468 A | 2/1987 | Doster et al. | 364/200 |
| 4,677,588 A | 6/1987 | Benjamin et al. | 364/900 |
| 4,800,384 A | 1/1989 | Snijders | 340/825.52 |
| 5,086,385 A | 2/1992 | Launey et al. | 364/188 |
| 5,195,092 A | 3/1993 | Wilson et al. | 370/94.2 |
| 5,224,205 A | 6/1993 | Dinkin et al. | 395/200 |
| 5,283,819 A | 2/1994 | Glick et al. | 379/90 |
| 5,289,461 A | 2/1994 | de Nijs | 370/58.1 |
| 5,325,423 A | 6/1994 | Lewis | 379/90 |
| 5,341,374 A | 8/1994 | Lewen et al. | 370/85.4 |
| 5,371,852 A | 12/1994 | Attanasio et al. | 395/200 |

(List continued on next page.)

FOREIGN PATENT DOCUMENTS

| | | | |
|---|---|---|---|
| EP | 0 756 276 A1 | 1/1997 | G11B/15/087 |
| EP | 0 762 684 A2 | 3/1997 | H04H/1/00 |
| EP | 0 782 332 A2 | 7/1997 | H04N/5/44 |

(List continued on next page.)

OTHER PUBLICATIONS

IEEE Standard for a High Performance Serial Bus, IEEE Computer Society, The Institute of Electronic Engineers, Inc., 345 East 47th Street, New York, NY 10017–2394, USA ISBN 1–55937–583–3, pp. iii–11, pp. 19–47, pp. 137–172, pp. 173–198, pp. 199–242, Aug. 30, 1996.

(List continued on next page.)

*Primary Examiner*—Zarni Maung
*Assistant Examiner*—Wen-Tai Lin
(74) *Attorney, Agent, or Firm*—Dirk Brinkman; Andrew J. Curtin

(57) ABSTRACT

A method is provided for remote monitoring and control of device (nodes) in a network system including a gateway device bridging the network system to an external network, wherein the method comprises: maintaining an address mapping table within the network system, the address mapping table comprising a node unique identifier column and node attribute information, receiving an input data packet from the external network at the gateway device, parsing the input data packet into an output request and input data, mapping the input data to a particular node on an internal network connected to the gateway device, transmitting the input data to the particular node, receiving a response from the particular node, generating an output data packet comprising the response from the particular node, and forwarding the output data packet to the external network.

9 Claims, 24 Drawing Sheets

U.S. PATENT DOCUMENTS

| | | | |
|---|---|---|---|
| 5,408,619 A | 4/1995 | Oran | 395/325 |
| 5,412,720 A | 5/1995 | Hoarty | 380/15 |
| 5,434,914 A | 7/1995 | Fraser | 379/219 |
| 5,434,974 A | 7/1995 | Loucks et al. | 395/200 |
| 5,442,630 A | 8/1995 | Gagliardi et al. | 370/85.13 |
| 5,463,736 A | 10/1995 | Elko et al. | 395/848 |
| 5,493,638 A | 2/1996 | Hooper et al. | 395/135 |
| 5,515,511 A | 5/1996 | Nguyen et al. | 395/200.02 |
| 5,517,618 A | 5/1996 | Wada et al. | 395/200.15 |
| 5,528,507 A | 6/1996 | McNamara et al. | 364/483 |
| 5,535,336 A | 7/1996 | Smith et al. | 395/200.06 |
| 5,546,549 A | 8/1996 | Barrett et al. | 395/309 |
| 5,561,709 A | 10/1996 | Remillard | 379/96 |
| 5,579,308 A | 11/1996 | Humpleman | 370/58.1 |
| 5,579,486 A | 11/1996 | Oprescu et al. | 395/200.15 |
| 5,581,461 A | 12/1996 | Coll et al. | 395/205 |
| 5,586,261 A | 12/1996 | Brooks et al. | 395/200.02 |
| 5,608,447 A | 3/1997 | Farry et al. | 348/7 |
| 5,617,539 A | 4/1997 | Ludwig et al. | 395/200.02 |
| 5,634,010 A | 5/1997 | Ciscon et al. | 395/200.15 |
| 5,675,390 A | 10/1997 | Schlinder et al. | 348/552 |
| 5,689,641 A | 11/1997 | Ludwig et al. | 395/200.02 |
| 5,694,334 A | 12/1997 | Donahue et al. | 364/514 R |
| 5,712,688 A | 1/1998 | Eglit | 348/510 |
| 5,722,041 A | 2/1998 | Freadman | 455/6.3 |
| 5,724,106 A | 3/1998 | Autry et al. | 348/734 |
| 5,729,689 A | 3/1998 | Allard et al. | 395/200.58 |
| 5,734,589 A | 3/1998 | Kostreski et al. | 364/514 A |
| 5,745,909 A | 4/1998 | Perlman et al. | 707/513 |
| 5,752,246 A | 5/1998 | Rogers et al. | 707/10 |
| 5,754,548 A | 5/1998 | Hoekstra et al. | 370/402 |
| 5,758,084 A | 5/1998 | Silverstein et al. | 395/200.58 |
| 5,856,974 A * | 1/1999 | Gervais et al. | 370/392 |
| 6,044,403 A * | 3/2000 | Gerszberg et al. | 709/225 |
| 6,073,176 A * | 6/2000 | Baindur et al. | 709/227 |
| 6,081,533 A * | 6/2000 | Laubach et al. | 370/342 |
| 6,122,758 A * | 9/2000 | Johnson et al. | 714/47 |
| 6,131,119 A * | 10/2000 | Fukui | 709/224 |
| 6,170,057 B1 * | 1/2001 | Inoue et al. | 713/153 |
| 6,202,210 B1 * | 3/2001 | Ludtke | 725/20 |
| 6,219,697 B1 * | 4/2001 | Lawande et al. | 709/221 |
| 6,233,611 B1 * | 5/2001 | Ludtke et al. | 709/223 |

FOREIGN PATENT DOCUMENTS

| | | | | |
|---|---|---|---|---|
| EP | 0 808 061 A2 | 11/1997 | | H04N/7/01 |
| EP | 0 812 091 A2 | 12/1997 | | H04L/29/06 |
| EP | 0 812 092 A2 | 12/1997 | | H04L/29/06 |
| EP | 0 825 783 A2 | 2/1998 | | H04N/7/52 |
| EP | 0 825 784 A2 | 2/1998 | | H04N/7/52 |
| EP | 0 862 303 A2 | 2/1998 | | H04L/29/06 |
| EP | 0 827 062 A1 | 3/1998 | | G06F/1/32 |
| EP | 0 833 485 A1 | 4/1998 | | H04L/29/00 |
| EP | 0 834 815 A2 | 4/1998 | | G06F/13/42 |
| EP | 0 835 029 A2 | 4/1998 | | H04N/7/24 |
| EP | 0 838 926 A2 | 4/1998 | | H04L/12/64 |
| EP | 0 841 776 A1 | 5/1998 | | H04L/12/28 |
| EP | 0 841 833 A2 | 5/1998 | | H04Q/11/04 |
| EP | 0 843 482 A2 | 5/1998 | | H04N/7/24 |
| EP | 0 848 568 A1 | 6/1998 | | H04Q/11/00 |
| EP | 0 849 884 A1 | 6/1998 | | H04B/1/20 |
| EP | 0 849 913 A2 | 6/1998 | | H04L/12/28 |
| EP | 0 853 398 A2 | 7/1998 | | H04L/12/18 |
| EP | 0 859 306 A2 | 8/1998 | | G06F/3/00 |
| EP | 0 859 322 A2 | 8/1998 | | G06F/15/16 |
| EP | 0 864 984 A2 | 9/1998 | | G06F/13/00 |
| EP | 0 833 514 A2 | 4/1999 | | H04N/7/24 |
| JP | WO 97/38513 | 10/1997 | | H04L/29/06 |
| JP | WO 98/04068 | 1/1998 | | H04L/12/40 |
| WO | WO 97/09800 | 3/1997 | | H04L/12/280 |
| WO | WO 97/28504 | 8/1997 | | G06F/13/10 |
| WO | WO 97/33230 | 9/1997 | | G06F/13/12 |
| WO | WO98/11685 | 3/1998 | | H04H/1/02 |
| WO | WO98/11726 | 3/1998 | | H04N/7/18 |

OTHER PUBLICATIONS

Sedgwick, John, "The Complexity Problem; Industrial Design," Information Access Company, a Thomson Corporation Co., ASAP, The Atlantic, vol. 271, No. 3, P. 96, Mar. 1993.

Burton, Larry, et al., The Residential Gateway, XP 000620803; 1996 Annual Review of Communications, pp. 457–467, 1996.

Elrich, David, "Firewire: The Next Connection," Popular Science, pp. 84–87, Jan. 1998.

DiGirolamo, Joel A., et al., "The VESA Home Network, A White Paper", digirol@lexmark.com, Lexmark International, Inc., pp. 1–10, before 1998.

"Full Service Access Networks (FSAN) Documents", Eighth International Workshop (http://www.labs.bt.com/profsoc/access), ATLANTA Version 2, pp. 1–24, 1997.

"The Residential Gateway, Functional Specifications," 24 pages, http://info.gte.com no date.

* cited by examiner

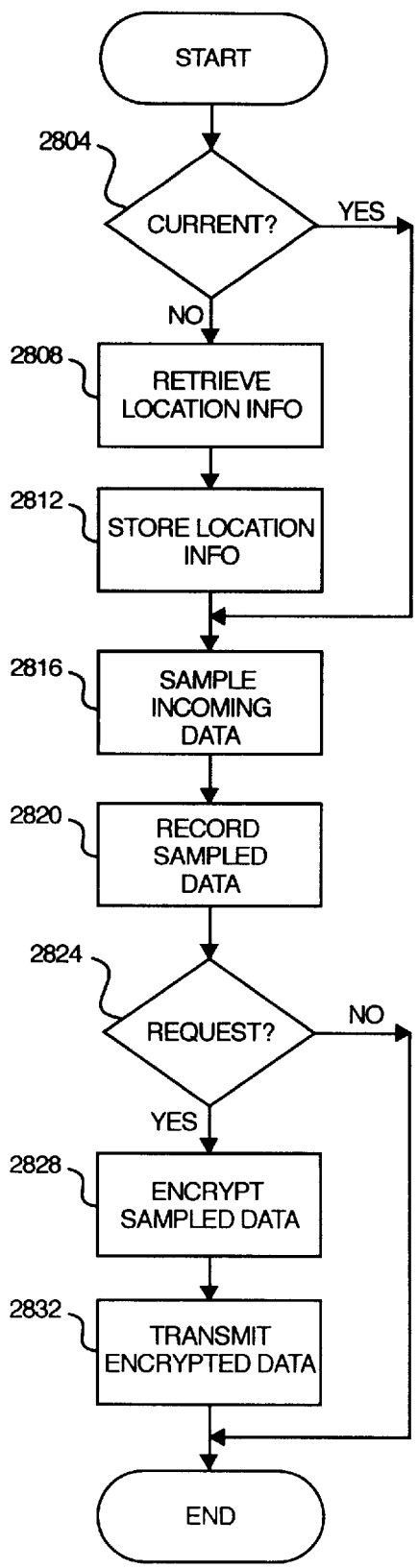
FIG. 25
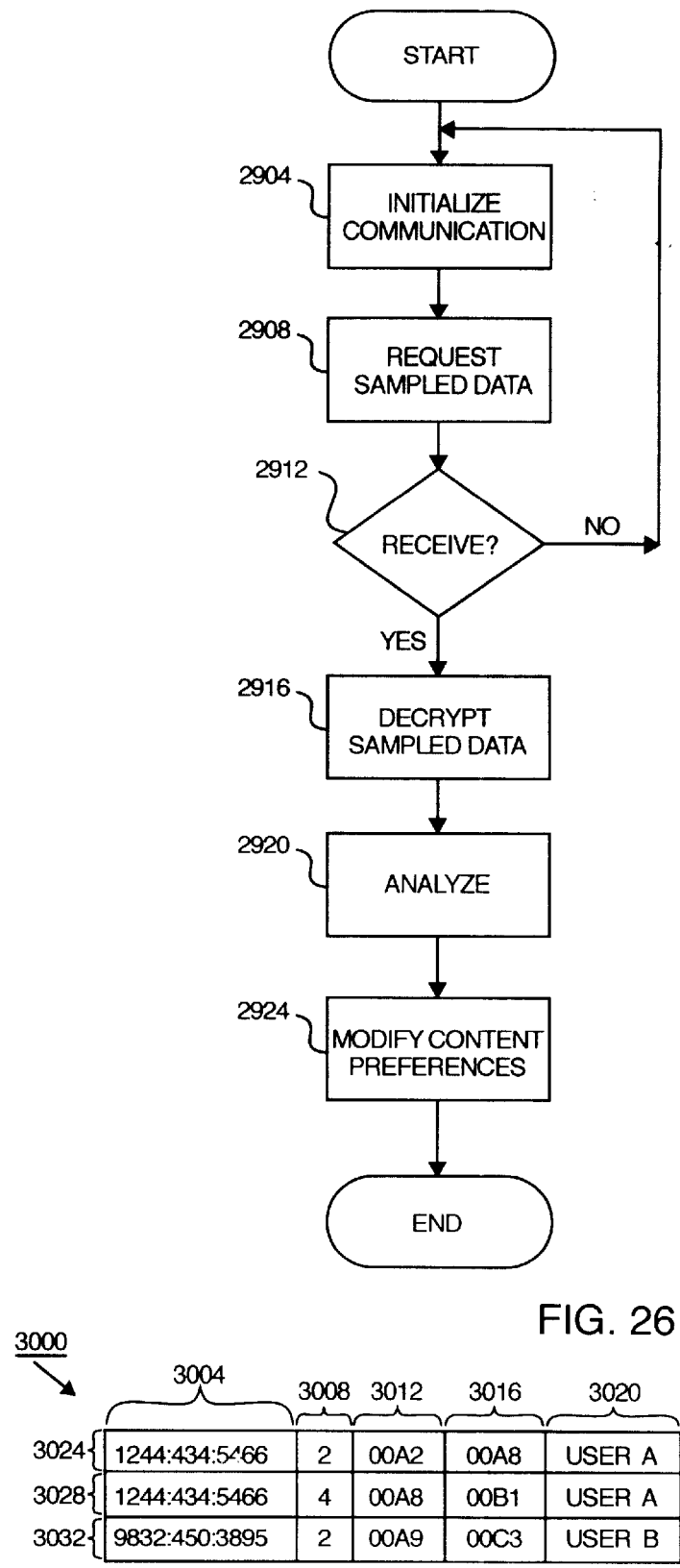
FIG. 26
FIG. 27

REMOTE MONITORING AND CONTROL OF DEVICES CONNECTED TO AN IEEE 1394 BUS VIA A GATEWAY DEVICE

CROSS REFERENCE TO RELATED APPLICATIONS

This application is a continuation and claims the benefit under Title 35 U.S.C. 120 of earlier filed U.S. application Ser. No. 09/140,899, filed Aug. 25, 1998, abandoned Jan. 6, 2000, entitled "BITMAP TRANSFER IN PLUG AND PLAY NETWORK", and U.S. application Ser. No. 09/144, 678, filed Aug. 31, 1999, abandoned Jan. 6, 2000, entitled "HOME DIGITAL NETWORK INTERFACE." This application is related to U.S. application Ser. No. 09/302,636, entitled "HOME GATEWAY", abandoned U.S. application Ser. No. 09/302,023, entitled "GEOGRAPHIC DATA COLLECTION", U.S. application Ser. No. 09/303,100, entitled "COMMAND AND CONTROL TRANSFER", and U.S. application Ser. No. 09/302,022, entitled "BITMAP TRANSFER", and U.S. Pat. No. 6,378,000, entitled "ADDRESS MAPPING", all filed on the same day herewith, and all of which are incorporated herein by reference in their entirety.

BACKGROUND OF THE INVENTION

1. Field of the Invention

The present invention pertains generally to the field of home entertainment systems, and more specifically to communication and control technologies in home entertainment systems.

2. Background

In the past, a home entertainment system frequently consisted of simply a television set (TV) and a video cassette recorder (VCR). One or two coaxial or composite cables interconnected the TV and VCR from input-to-output and/or output-to-input respectively. However, in recent years, home entertainment systems have become increasingly complex.

Advances in home electronic devices, such as the compact disk (CD) player, digital-video disc (DVD) player, gaming systems, surround sound audio systems, hand held video cameras, etc., naturally compelled consumers to connect the additional devices to their home entertainment system. Each new device added at least two more wires (generally, power and input/output) to the complex web of wires snaking their way in and out of the various devices.

Originally, switch boxes were employed to cut down on the complexity of the interconnections-between the various devices. For example, a simple "A/B" switch box allowed a user to selectively choose one input or another, without having to disconnect and re-engage coaxial cables between the devices. As the number of devices in home entertainment systems increased, however, the use of A/B switch boxes to interconnect the devices becomes cumbersome and inefficient.

Notably, consumers generally desire less wires, simpler interconnect schemes and, as the functionality and sophistication of home entertainment devices increase, to dispose of the myriad individual component remote controls needed to operate the respective devices. Indeed, most remote control "features" are never used (see, e.g., "The Complexity Problem: Industrial Design", Atlantic Monthly, Vol. 271, No. 3, March 1993, p. 96); if for no other reason, this is due to the differing sequences and/or number of steps involved with the control and operation of each respective device.

One solution to the aforementioned control problem is proposed in U.S. Pat. No. 5,675,390 (the "'390 patent") by Schindler et al. As depicted in FIG. 1 of the '390 patent, an entertainment system is centrally controlled by a personal computer. According to the Schindler et al. system, control is consolidated in the personal computer, wherein a "hub and spoke", or "star" type communication topology is employed—i.e., with all communications passing through the personal computer (or hub). By this configuration, each device requires its own dedicated connection to the personal computer. Such a solution may work well for tightly integrated home electronics equipment and a sophisticated computer user. However, it requires an even greater number of interconnecting wires than were previously employed. (Note the number of I/O plugs depicted in FIG. 7 of the '390 patent). Further, such a system is not scalable. That is, as new devices are to be added to the system, additional corresponding adapters/controllers must be added to the personal computer.

A similar solution is proposed in U.S. Pat. No. 5,722,041 (the "'041 patent") by Freadman. FIG. 2 of the '041 patent best depicts Freadman's home entertainment system. Like Schindler et al., control is centrally located in a personal computer. Media feeds are through a combination multi-channel modem and analog radio frequency mixer, which connects to a number of terminal devices through a coaxial cable. Although a reduction in the number of wires is accomplished, shared functionality between the devices is minimal, e.g., one device doesn't control another device and vice-versa.

In particular, adding a user-operated personal computer to control a home entertainment system network does not, in itself, reduce complexity. In fact, it may increase the complexity. The computer is often difficult, if not cumbersome to control. Hardware and software components generally need to be configured to communicate, and the devices properly initialized. Upgrades to either peripheral devices (e.g., VCRs, TVs, etc.) or the computer itself may necessitate a complete overhaul of the system operating software, thereby introducing incompatibilities and uncertainties in the system performance.

With regard to the myriad interconnection wires in more complex home entertainment systems, one solution is the IEEE 1394-1995 standard and its extensions IEEE 1394a, and IEEE 1394b, which are referred to herein as "IEEE 1394". In one embodiment, a IEEE 1394 cable is a six strand cable: one strand for power, one strand for ground, two strands for data, and two strands for strobes used to synchronize the data strands. In an alternative embodiment, a four strand cable can be used, omitting the power and ground strands. IEEE 1394 cable also comprises a shield, which prevents electromagnetic interference. At its core, IEEE 1394 cable is essentially a high performance serial bus, having data rates as of this present writing of up to 400 megabits per second.

Advantageously, the IEEE 1394 bus reduces the need for the myriad wires in a home entertainment system, as the component electronic devices may be designed to receive power and communication through the IEEE 1394 cable, thereby reducing the connections needed for most devices to as few as a single cable in a backplane bus environment. The IEEE 1394-1995 standard provides a specification for aspects of the physical, link and transaction layers for implementing of the IEEE 1394 bus, including provisions for such functions as resetting the bus, bus arbitration, node configuration, standard packet structures, initializing packet transmission, sending and receiving asynchronous packets, sending and receiving isochronous packets, transaction control, and error detection and correction.

Communication over IEEE 1394 bus differs from many previous technologies in that it is purely digital. In particular, data carried on the IEEE 1394 bus is either digital from the source (e.g., a CD-ROM), or it must be converted by an analog-to-digital converter before being placed on the IEEE 1394 bus. Further, communication in a IEEE 1394-based system is peer-to-peer, i.e., each device (a.k.a. "node") on the IEEE 1394 bus can communicate with any other node without requiring communication/control requests to be processed through a central device/node (e.g., as is required in a "client-server" type configuration). In a IEEE 1394-based system, the controller can reside in any node, so in a sense, the IEEE 1394 bus itself becomes the controller.

Challenges for proponents of IEEE 1394 have been not been so much at the lower layers of operation, that is in the physical, link and transaction layers (although bridges between protocols and data packet structure continue to be areas of contention), but rather in the high layers of the network protocol stack, such as the application layer. Recent developments in the broadcast television and cable industries, such as high definition television (HDTV) and consolidation in the cable broadcast industry are exponentially expanding the number of services and content available to consumers. To this end, interoperability between home electronic devices is strongly desired, as are common and/or standard functionality, ease of use and scalability. As such, there is a need for a system to control and manage the expanding array of devices and services that can be connected and supported, respectively, in a IEEE 1394-based home entertainment system.

SUMMARY OF THE INVENTION

In accordance with a first aspect of the present invention, a method is provided for remote monitoring and control of device (nodes) in a network system including a gateway device bridging the network system to an external network, wherein the method comprises:

- maintaining an address mapping table within the network system, the address mapping table comprising a node unique identifier column and node attribute information;
- receiving an input data packet from the external network at the gateway device;
- parsing the input data packet into an output request and input data;
- mapping the input data to a particular node on an internal network connected to the gateway device;
- transmitting the input data to the particular node;
- receiving a response from the particular node;
- generating an output data packet comprising the response from the particular node; and
- forwarding the output data packet to the external network.

As will be apparent to those skilled in the art, other and further aspects and advantages of the present invention will appear hereinafter.

BRIEF DESCRIPTION OF THE DRAWINGS

Preferred embodiments of the present invention are illustrated by way of example, and not by way of limitation, in the figures of the accompanying drawings, in which like reference numerals refer to like components, and in which:

FIG. 25 is a flowchart depicting a method for collecting statistical geographic location information in a network environment as performed by a home gateway;

FIG. 26 is a flowchart depicting a method for collecting statistical geographic location information as performed by a central server; and FIG. 27 is a diagram of an exemplary statistical data table.

DETAILED DESCRIPTION OF THE PREFERRED EMBODIMENTS

The IEEE 1394-1995 standard, which is hereby fully incorporated herein by reference for all that it describes and teaches, provides background information for the following description and figures in the accompanying drawings. In particular, selected portions of the IEEE 1394-1995 standard are described with reference to FIGS. 1 through 4.

IEEE 1394 Overview

Figure 1:
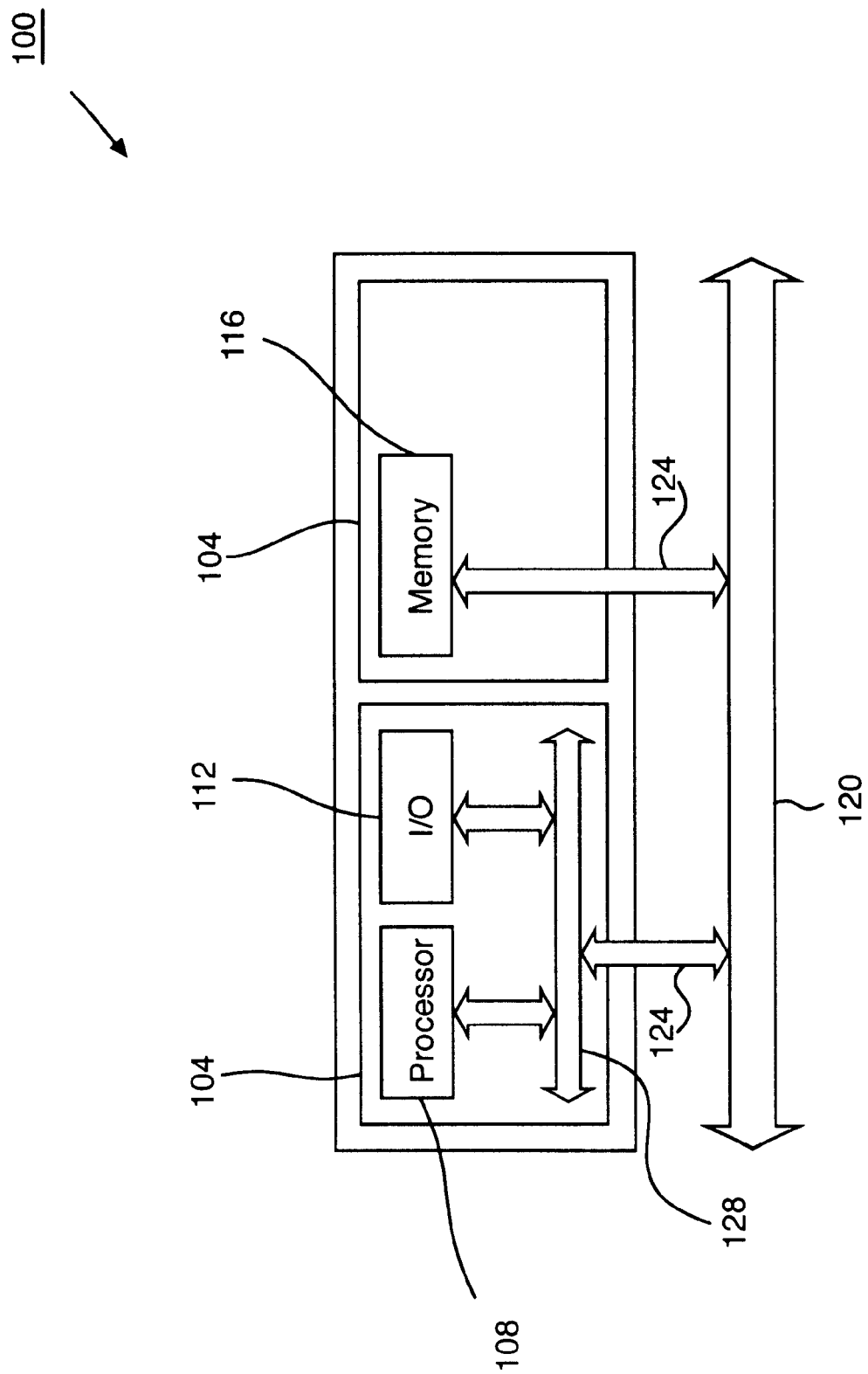
FIG. 1 depicts an exemplary IEEE 1394 module architecture.

FIG. 1 depicts an exemplary IEEE 1394 module 100, which comprises a plurality of addressable nodes 104. Each node 104 may comprise a processor unit 108 and an I/O unit 112 interconnected via a local bus 128. Alternatively, a node 104 may comprise a memory unit 116. Each node 104 connects to a IEEE 1394 carrier 120 via a respective bus connector 124.

Figure 2:
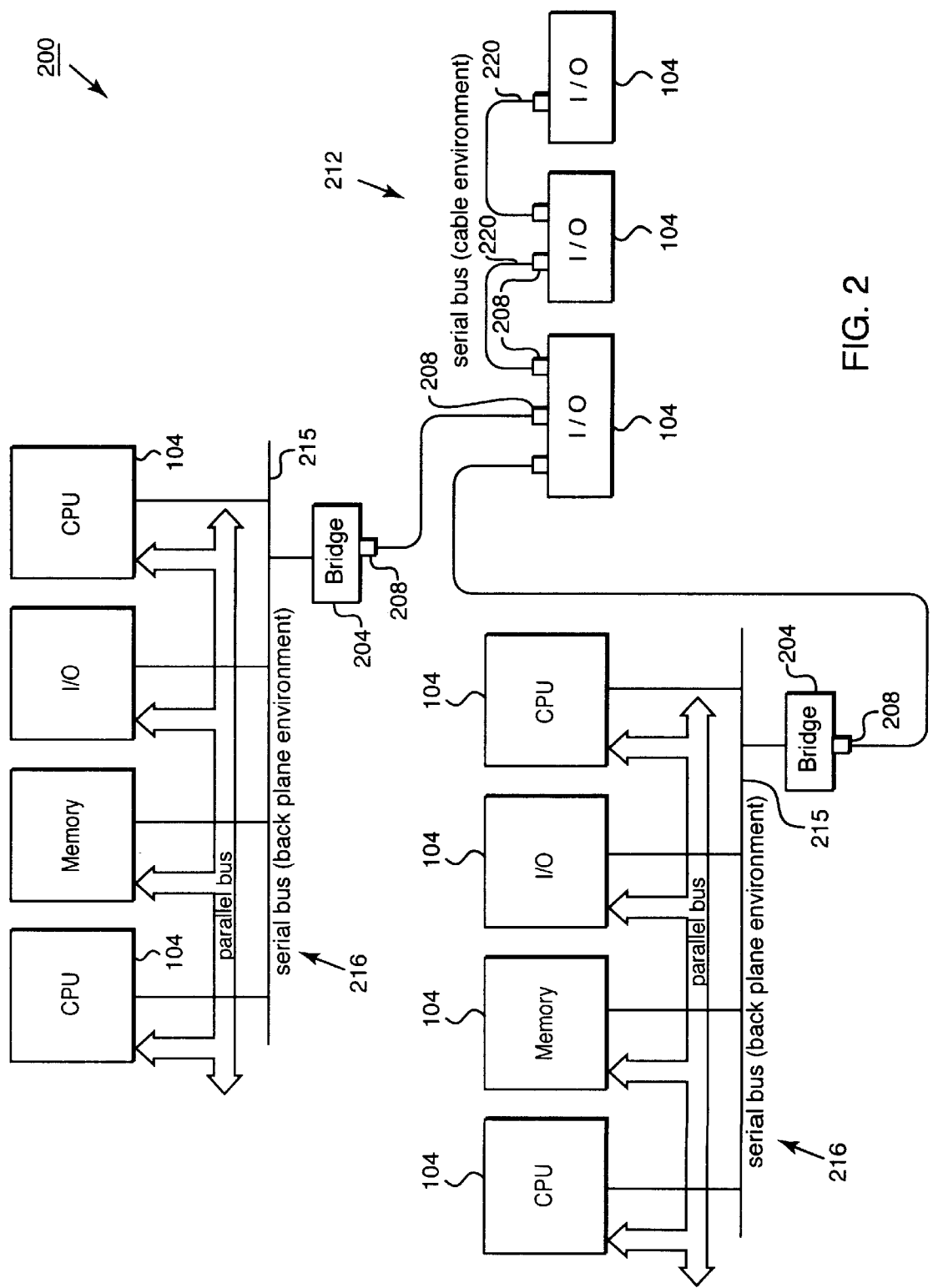
FIG. 2 depicts a exemplary IEEE 1394 network topology.

FIG. 2 depicts exemplary IEEE 1394 physical network topology 200, which comprises two IEEE 1394 "backplane environments" 216 respectively bridged to a IEEE 1394 "cable environment" 212.

In a backplane environment 216, the physical topology is a multidrop bus 215. The physical media includes two, single ended conductors that run the length of the backplane and have connectors distributed thereon for connecting a plurality of IEEE 1394 nodes 104.

In a cable environment 212, the physical topology is a "noncyclic" network (meaning that closed loops are not supported) with finite branches and extent. Respective IEEE 1394 cables 220 connect together ports 208 on different nodes 104. Each port 208 typically comprises terminators, transceivers, and arbitration logic circuitry (not shown). The cables 220 and ports 208 function, in part, as cable repeaters, which repeat signals incident thereon to an adjacent node 104. This repeating feature allows nodes 104 in the cable environment 212 to simulate a single, logical bus. When two differing IEEE 1394 buses are connected together, e.g., in a backplane environment 216 or in a cable environment 212, a bridge 204 is used to convert communications between the different network environments.

In accordance with the IEEE 1394 standard, a sixty-four bit addressing scheme is employed by the IEEE 1394 network 200. The upper sixteen bits of each address represent the "node_ID". The most significant ten bits of the node_ID identify the particular logical bus or "bus_ID" (e.g., bus 215) in the overall EEEE 1394 network 200. Thus, up to one thousand twenty three buses can be employed in the IEEE 1394 network 200. The next most significant six bits of the node_ID represent a particular node's physical address or "physical_ID". Sixty-three independently addressable nodes (e.g., nodes 104) can reside on a particular IEEE 1394 bus (e.g., bus 215). Various portions of the remaining forty-eight bits of address space are allocated for specific resources, either to a particular bus, or a particular node.

Figure 3:
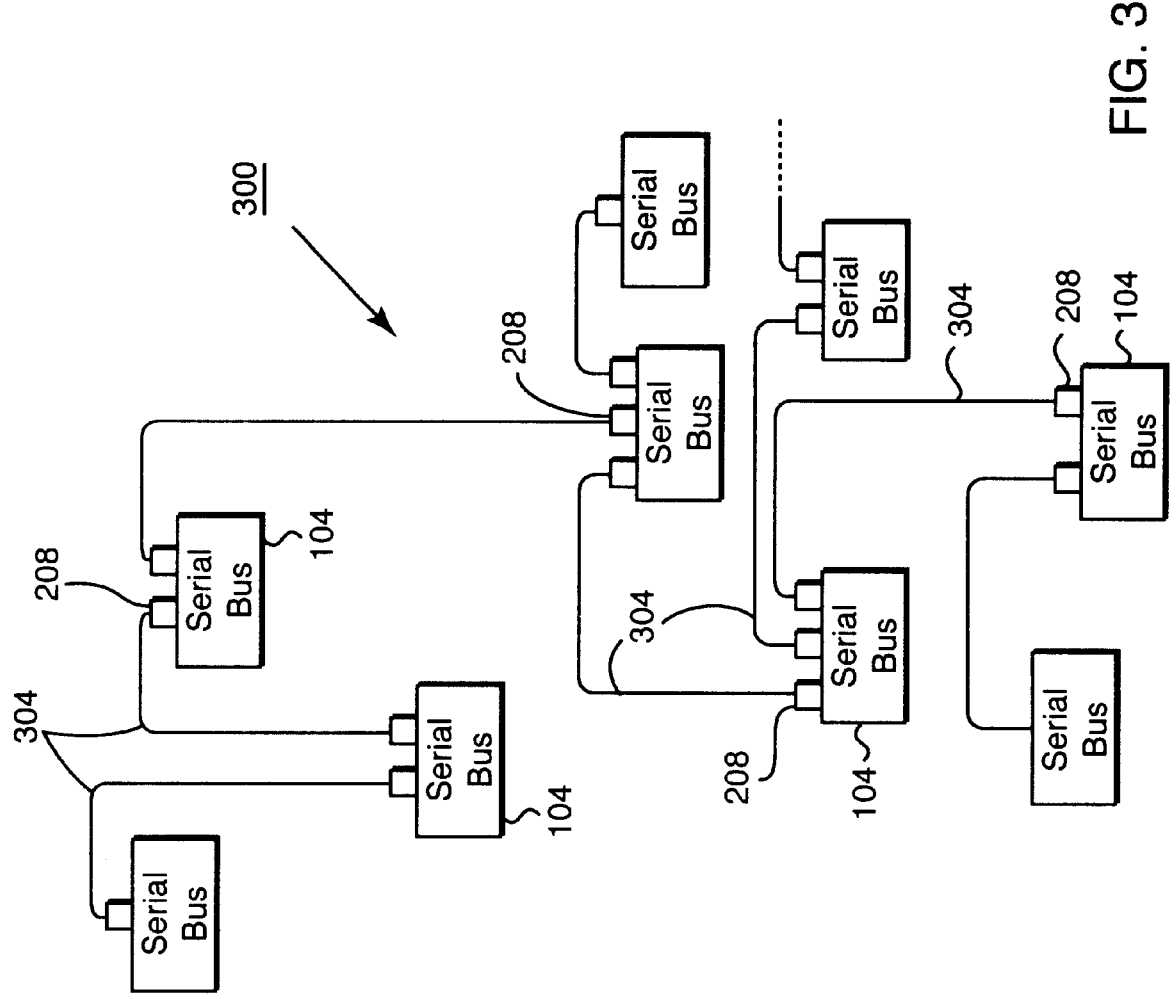
FIG. 3 depicts an exemplary cable-based IEEE 1394 topology.

FIG. 3 depicts an exemplary IEEE 1394 cable topology 300. In accordance with this configuration, a number of nodes 104 are "daisy-chained" together between ports 208 by respective IEEE 1394 cables 304. Each node 104 acts as a repeater, repeating signals between one port 208 to the next port so they can be transmitted over the cables 304 between the respective nodes 104.

Figure 4:
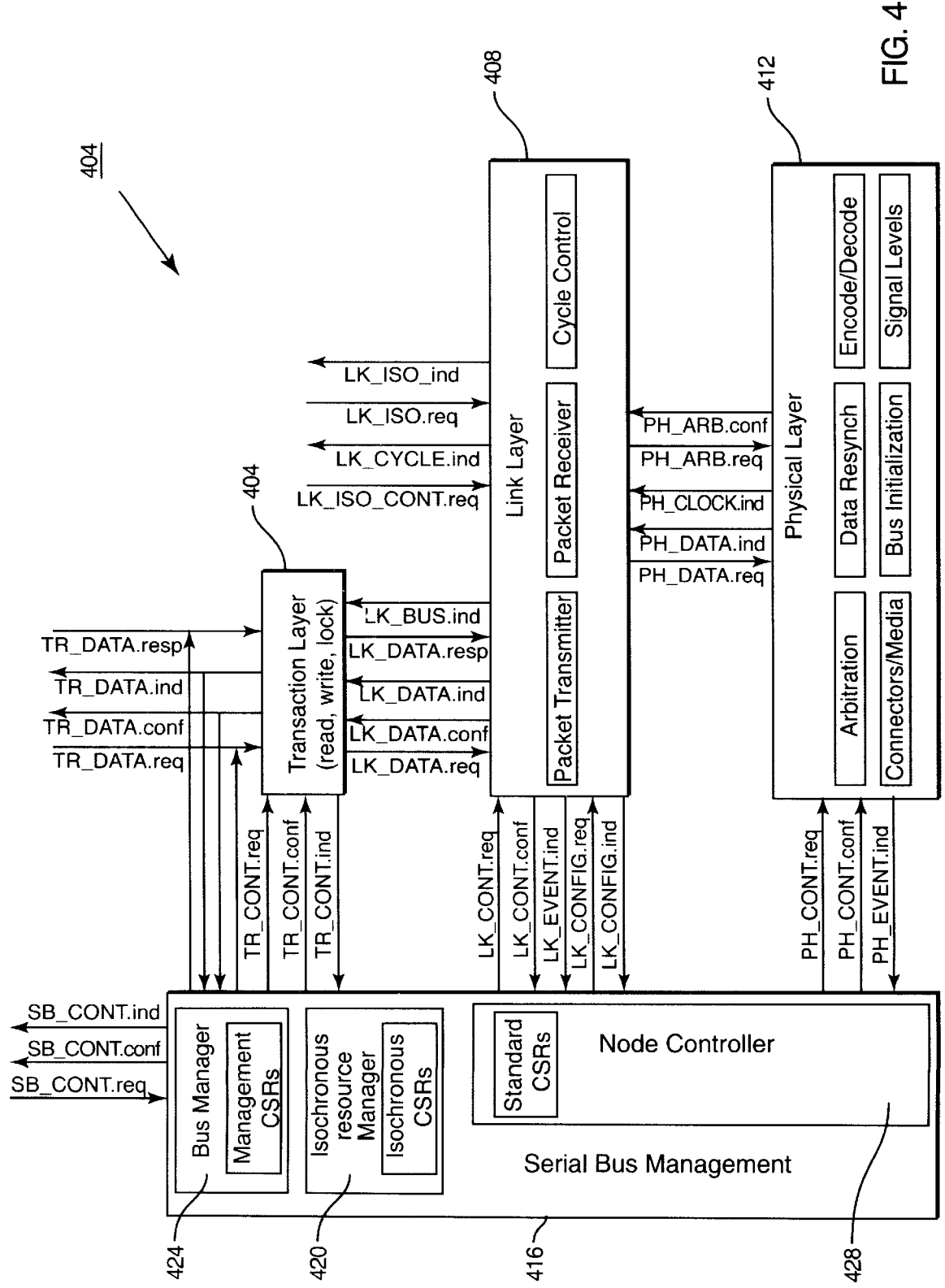
FIG. 4 depicts an exemplary IEEE 1394 node protocol stack.

FIG. 4 depicts a protocol stack 400 illustrating the relationships between the hardware and software components within an exemplary IEEE 1394 node 104. In particular, four layers are depicted in the protocol stack 400: transaction layer 404, link layer 408, physical layer 412, and serial bus management layer 416. Additional layers (not shown), such as an application layer, may also be included in the protocol stack 400.

In particular, the transaction layer 404 defines a complete request-response protocol to perform bus transactions to support read, write and lock operations. The transaction layer 404 also provides a path for isochronous management data to get to the serial bus management layer 416.

The link layer 408 provides for one-way data transfer with confirmation of request (i.e., an "acknowledged datagram") service to the transaction layer 404. More particularly, the link layer 408 provides addressing, data checking and data framing for packet transmission and reception, and also provides an isochronous data transfer service directly to the application. This includes generation of timing and synchronization signals (e.g., a "cycle signal").

The physical layer 412 translates logical symbols used by link layer 408 into electrical signals for output onto a IEEE 1394 cable. The physical layer 412 also provides an arbitration service to ensure that only one node at a time is sending data. In a preferred embodiment, the physical layer 412 provides data resynch and repeat service, as well as automatic bus initialization.

The serial bus management layer 416 provides bus management, isochronous resource management and node control. For example, in the cable environment 212 of FIG. 2, the serial bus management layer's 416 isochronous resource manager 420 grants the resources necessary for the respective nodes 104 to allocate and deallocate cooperatively the isochronous resources, channels and bandwidth necessary for efficient and orderly isochronous operations.

A bus manager 424 provides services, such as performance optimization, power and speed management and topology management to other nodes, 104 on the bus. Finally, a node controller 428 manages all control and status registers needed by the nodes 104 on the bus, and communicates with the physical layer 412, the link layer 408, the transaction layer 404 and one or more other application layers (not shown).

Home Entertainment and Home Office System

Figure 5:
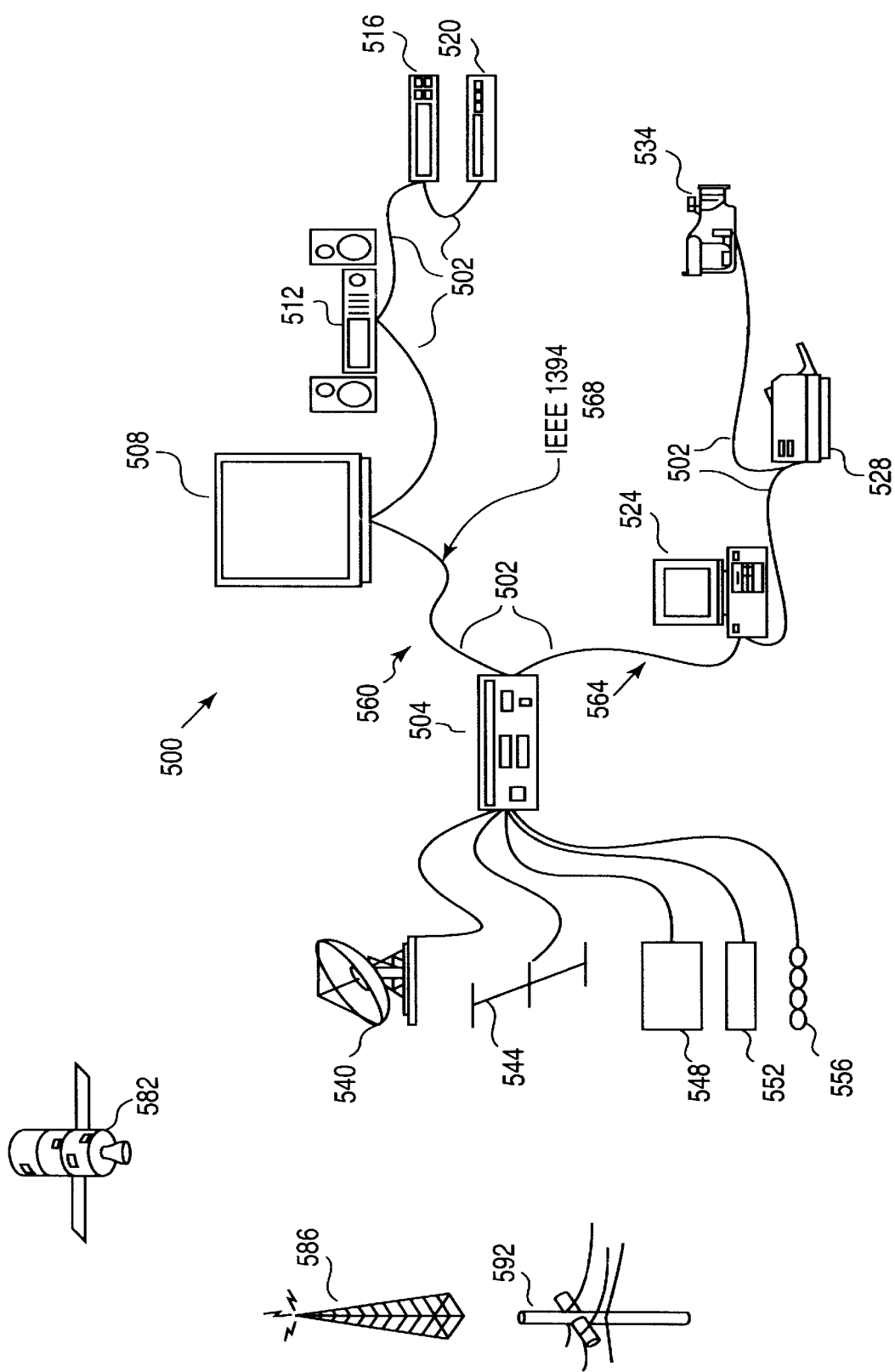
FIG. 5 depicts a home gateway bridging multiple external service providers with a IEEE 1394-based network.

FIG. 5 depicts a home gateway 504 bridging multiple external service providers to a preferred home entertainment and home office system network, referred hereafter as "home entertainment system network" 500 . The. home entertainment system network 500 is connected by an IEEE 1394 bus 568 , which is preferably configured in a cable environment (described above with reference to FIGS. 2–3). In particular, a series of daisy-chained, IEEE 1394cables 502 interconnect between ports of various electronics components of the home entertainment system 500 to form the IEEE 1394 bus 568 . For example, a TV 508, a stereo 512, a VCR 516 and a DVD 520 are connected in one chain 560. In another chain 564, a personal computer 524, a printer 528, and a digital camera 534 are connected.

Each of the respective chains 560 and 564 of electronic components are connected to the home gateway 504, which acts as a bridge between one or more external networks and the respective internal network chains 560 and 564. (i.e., as opposed to a bridge between two different bus environments). For example, the home gateway 504 is capable of receiving media feeds from a satellite 582 via a satellite receiver 540, a broadcast tower 586 via an antenna 544, as well as feeds from local land lines 592 (e.g. copper twisted pair, coaxial or fiber optic cable) via a coaxial cable receiver 548, fiber optic cable receiver 552, or telephone cable receiver 556, respectively. (Note: although the various receivers are shown outside of the home gateway 504, the actual receivers or receptacles can be contained within the home gateway 504 as well. They are shown outside of the home gateway 504 for illustration purposes only.)

The TV 508 preferably includes an internal television adapter that converts data from the IEEE 1394 bus 502 to NTSC (National Television Standards Committee) and/or ATSC (Advanced Television Systems Committee) video signals for presentation on the television screen. In an alternative preferred embodiment, the television adapter is an external device, which connects between the TV 508 and the IEEE 1394 cable 502. In either embodiment, the television adapter preferably includes an off-screen buffer, for image data not presently displayed, but to be displayed in the future, and an on-screen buffer, for image data presently displayed on the television screen. Furthermore, the television adapter can be incorporated into an auxiliary device connected to the television, such as a VCR, a DVD player, or a digital camera.

Home Gateway

Figure 6:
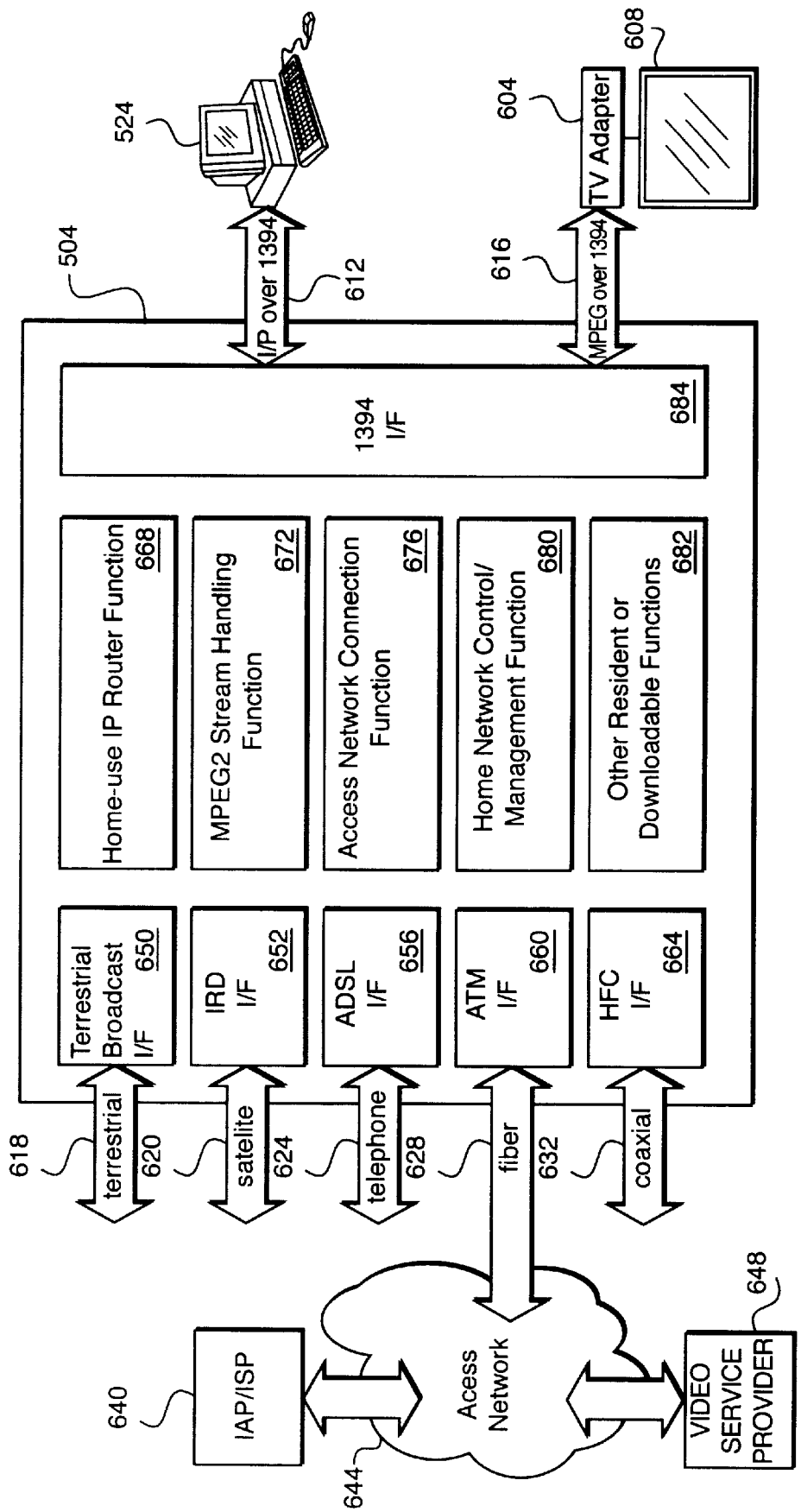
FIG. 6 is a functional block diagram of the home gateway of FIG. 5.

FIG. 6 depicts a functional block diagram for the home gateway 504, as well as for the components communicatively coupled to the home gateway 504.

The gateway 504 comprises one or more interfaces to communicate over an access network 644 through which respective services are provided. For example, services from an internet access provider ("IAP") or internet service provider ("ISP") 640, or from a video service provider ("VSP") 648 can be provided by connecting the respective home gateway interface, e.g., wireless interface "Terrestrial Broadcast I/F" 650, "Satellite I/F" 652, asynchronous digital subscriber line interface "ADSL I/F" 656, asynchronous transfer mode interface "ATM I/F" 660, or hybrid fiber coaxial interface "HFC I/F" 664, to the access network 644 via an appropriate network link, (e.g., terrestrial link 618, satellite link 620, telephone link 624, fiber link 628, or coaxial link 632, respectively). According to one preferred embodiment, adapter slots on the home gateway 504 receive one or more of the above interfaces. Such an embodiment provides for a flexible reconfiguration when new or upgraded communications technologies/hardware are connected to the home entertainment system 500.

A variety of applications are possible over the access network 644 from either the IAP/ISP 640 and/or the VSP 648, such as internet surfing, MPEG video streams (standard and high definition television), network gaming, an electronic program guide "EPG", and home network control. Accordingly, the home gateway 504 includes hardware and software to enable home-user IP routing 668, MPEG2 stream handling (including on-screen display "OSD" and EPG processing) 672, access network communication control 676, home network control/management 680, and other resident or downloadable functions 682 such as gaming, home automation and directory services. To this end, the firmware stack for the home gateway 504 is described below with reference to FIG. 8. The protocol stacks for implementing the above referenced functions are described below with reference to FIGS. 9 through 12.

The 1394 interface 684 is a necessary component of the home gateway 504 and it is used in conjunction with the network protocols described with reference to FIGS. 9–12. The 1394 interface 684 acts as a bridge between the external network protocols and the IEEE 1394 compliant bus which forms the internal network. For example, the 1394 I/F 684 supports an IP over 1394 link 612 and an MPEG over 1394 link 616, between a personal computer 524 and a TV adapter 604 (which, in one embodiment, converts IEEE 1394 data into an analog or a digital signal for a television 608).

Figure 7:
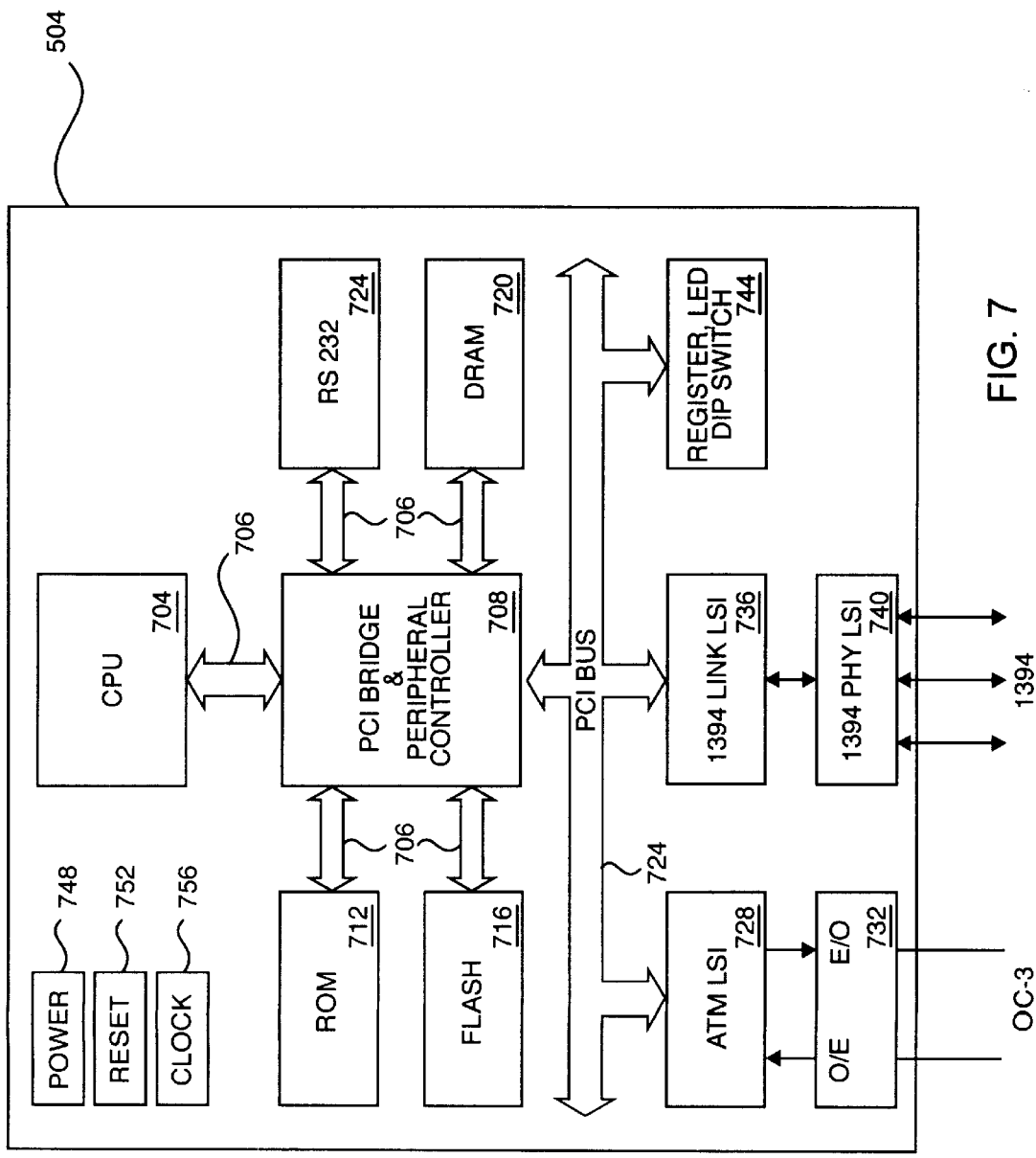
FIG. 7 is an alternate block diagram of the home gateway, illustrating hardware components.

As illustrated in FIG. 7, one embodiment of the home gateway 504 includes a power supply circuit 748, a reset circuit 752, a clock circuit 756, a central processing unit "CPU" 704, a local bus 706, a PCI bridge & peripheral controller 708, non-volatile memory (e.g., ROM 712 and FLASH 716), volatile memory (e.g., DRAM 720), an RS232 interconnect, and a PCI bus 724. Connected to the PCI bus 724 are an ATM LSI interface 728, which provides an ATM bridge and other functionality to the home gateway 504, a synchronous optical network ("SONET") interface 732, which connects to an optical carrier 3 ("OC-3") level port, a 1394 LINK LSI 736, a 1394 PHY LSI, with three IEEE 1394 ports, and a register, LED and dip-switch unit 744.

Off-the-shelf hardware components are preferrably employed in the home gateway 504. For example, a presently preferred hardware component specification is set forth in Table 1. Where a particular manufacturer's product is preferred, it is specified.

a. TABLE 1

| | | |
|---|---|---|
| ii. | CPU | NR4650 133 MHz (NKK Micro Devices) |
| iii. | DRAM | 8 MB |
| iv. | ROM | 128 kB |
| v. | FLASH | 4 MB |
| vi. | PCI Bridge & Peripheral Controller | NR4650-PSC (NKK Micro Devices) |
| vii. | | |
| viii. | 1394 LINK LSI | MD8411 (Fuji Film Micro Device) |
| ix. | 1394 PHY LSI | MD8401 (Fuji Film Micro Device) |
| x. | ATM LSI | LASAR-155 (PMC-Sierra) |
| xi. | Internal Bus | PCI |

The CPU 704, ROM 712, FLASH 716, RS232 724 and DRAM 720 are communicatively coupled to each other via PCI bridge & peripheral controller 708 and local bus 706. The PCI bridge & peripheral controller 708 is also connected to the PCI bus 724. The PCI bus 724 is, in turn, connected to the ATM LSI 728, the 1394 LINK LSI 736 and register, LED and dip-switch unit 744.

Figure 8:
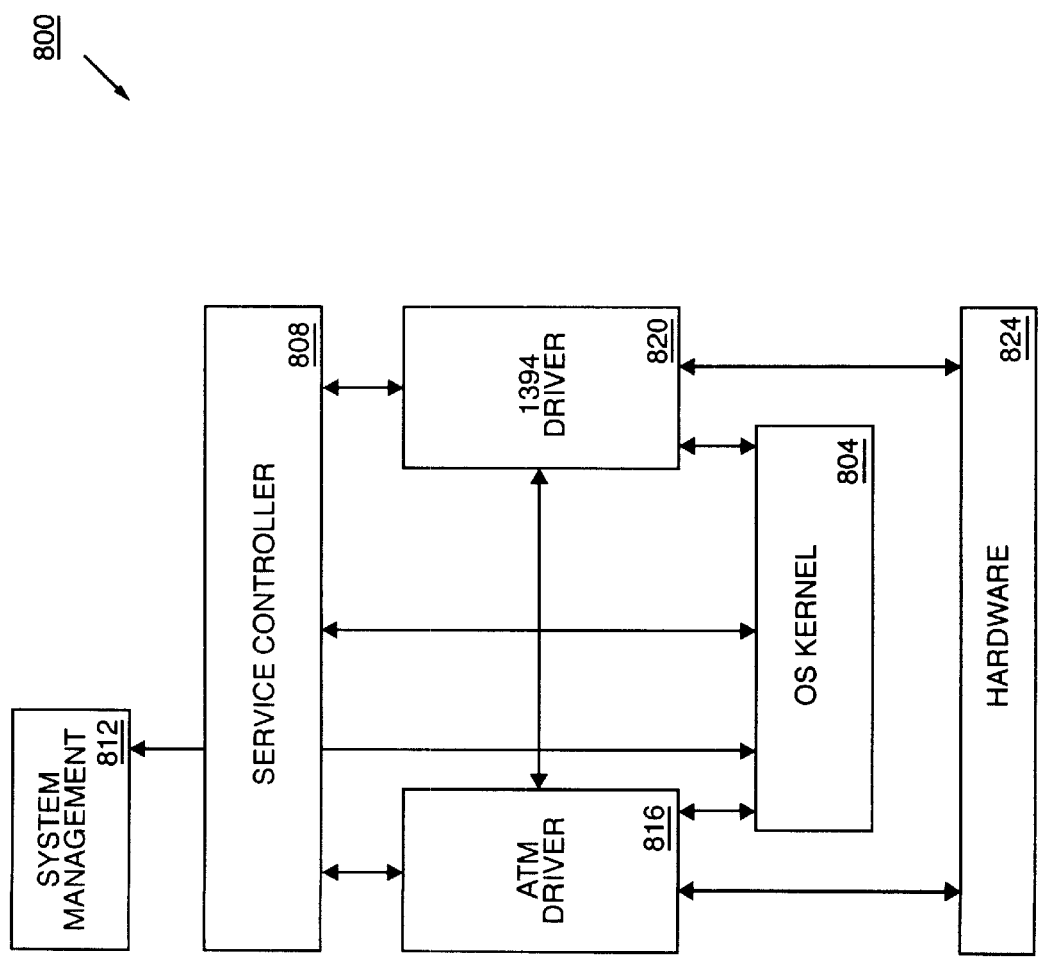
FIG. 8 is block diagram illustrating a firmware stack for the home gateway.

FIG. 8 depicts a firmware stack 800, employed by the home gateway 504. An operating system (OS) kernel 804 resides at the core of the firmware stack 800, and communicates with a service controller 808, system management 812, ATM driver 816 and 1394 driver 820. The ATM driver 816 communicates with the service controller 808, the 1394 driver 820 and various hardware components 824 (i.e., physical electronics components in the home entertainment system 500.). Similarly, the 1394 driver 820 communicates with the service controller 808, ATM driver 816 and hardware 824.

System management 812 includes functions for initialization, self-diagnostics, system health checking and debugging. Service controller 808 includes functions for MPEG TS and EPG filtering and multicasting, IP routing and terminal functions, MPEG over the 1394 bus and MPEG over ATM, as well as IP over 1394 bus and IP over ATM, address mapping, home network service command and control (e.g., MPEG service control, TV image control, remote handling, and camera control), and other functions (e.g., gaming, home automation, and directory services)

The 1394 driver 820 realizes asynchronous data transmission, isochronous data transmission, physical layer control packet transmission, bus reset and control, root and cycle master processing, configuration status register and configuration ROM handling, bus management and address mapping table updates, whereas the ATM driver 816 realizes ATM pack transmission and ATM permanent virtual connection ("PVC") establishment and release.

The OS kernel 804 provides for task switching, message queue and delivery, interrupt handling, timer management and memory management. Also, the OS kernel 804 provides the electronic device interoperability functions which are used to control home gateway 504.

The hardware 824 represents the physical layer, or lowest layer, of the firmware stack 800.

In a presently preferred embodiment, the home gateway 504 functions as a bridge/router between the external network 904 and the internal network 912 (described in detail with reference to FIGS. 9–12 below). The home gateway 504 therefore provides a middle-layer between the external network 904 and the internal network 912 that is used for protocol and data formatting transformation, as well as address mapping functionality (described below). In particular, the home gateway 504 is a preferred "managing node" for maintaining the address mapping table (described below with reference to FIG. 13), wherein the home gateway 504 stores node address information in a memory, periodically updates the node address information, polls IEEE 1394 nodes (as used herein, "IEEE 1394 nodes" refers to one or more nodes residing on the IEEE 1394 bus 568 and comporting with the node 104 described with reference to FIGS. 1–4 above) on the internal network 912 and gathers node attributes from the polled IEEE 1394 nodes for the address mapping table 1600. Further details of the address mapping 1600 and the address mapping service are described below with reference to FIGS. 13 and 19.

Bridge/Router Functionality

Figure 20:
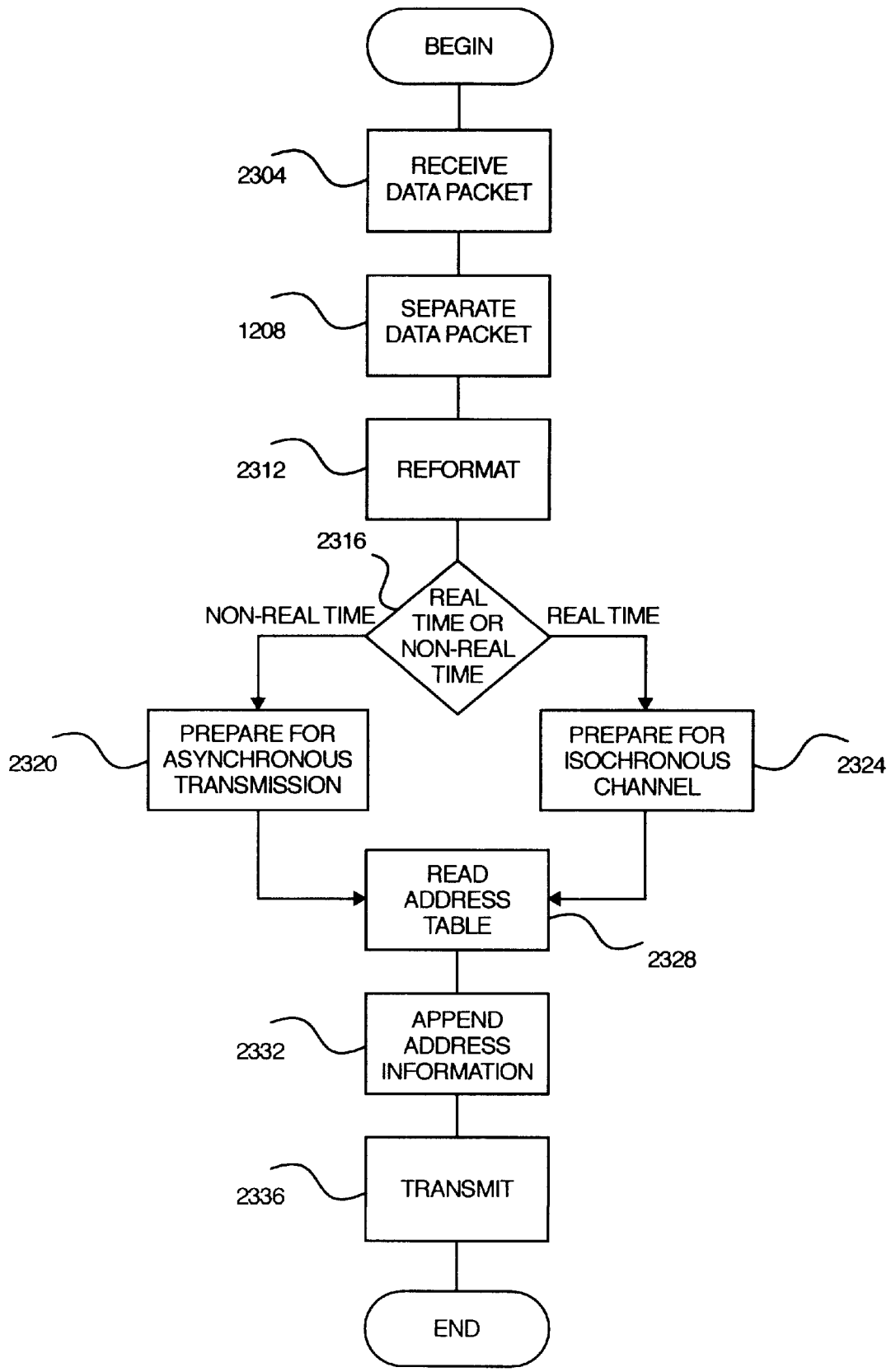
FIG. 20 is a flowchart depicting a method for formatting and routing data between an external network and an internal network.

FIG. 20 depicts a flowchart depicting the acts for formatting and routing data between an external network and an internal network. More particularly, FIG. 20 depicts the acts executed by the home gateway 504 in furthering its bridge/router functionality. It should be noted that the functionality depicted in FIG. 20 is described in further detail with regard to the MPEG and IP service sections below. It is the overall bridge/router functionality of the home gateway 504 that is the object of the following description.

The data formatting and routing process begins at act 2304, where a data packet is received by the home gateway 504. The information in the data packet is separated at act 2308. For example, header and/or address data is identified, as well as the data packet body. In act 2312, the data packet is transformed from a first digital format, to a second digital format. By way of example, act 2312 may include removing and adding header data from and to the data packet body, as well as reformatting the data structures themselves from an encrypted to a non-encrypted format.

At act 2316 a test is performed to determine whether the data packet contains real time or non-real time data. For example, a command is likely non-real time data. However, an MPEG transport stream is real time data. By analyzing the data packet header, the home gateway 504 can determine the type of data contained in the data packet. If the data packet body contains non-real time data, then processing continues to act 2320, where the data packet body is prepared for transmission as an asynchronous packet on the IEEE 1394 bus. On the other hand, if the data packet body comprises real time data, then processing continues to act 2324, where the data packet body is prepared for transmission over an isochronous channel of the IEEE 1394 bus. Acts 2320 and 2324 both continue to act 2328.

In act 2328, the address mapping table 1600 (described below with reference to FIG. 13) is read and address information from the address mapping table is cross-referenced. For example, the address information, e.g., the node id or node unique id, of the target IEEE 1394 node for the data packet is copied. With the data from act 2328, the home gateway 504 appends the address information to either the isochronous (act 2320) or asynchronous (act 2324) data packet in act 2332. In act 2336, the isochronous or asynchronous data packet is transmitted over the selected IEEE 1394 channel or address to the target IEEE 1394 node.

Protocol Stacks

Figure 9:
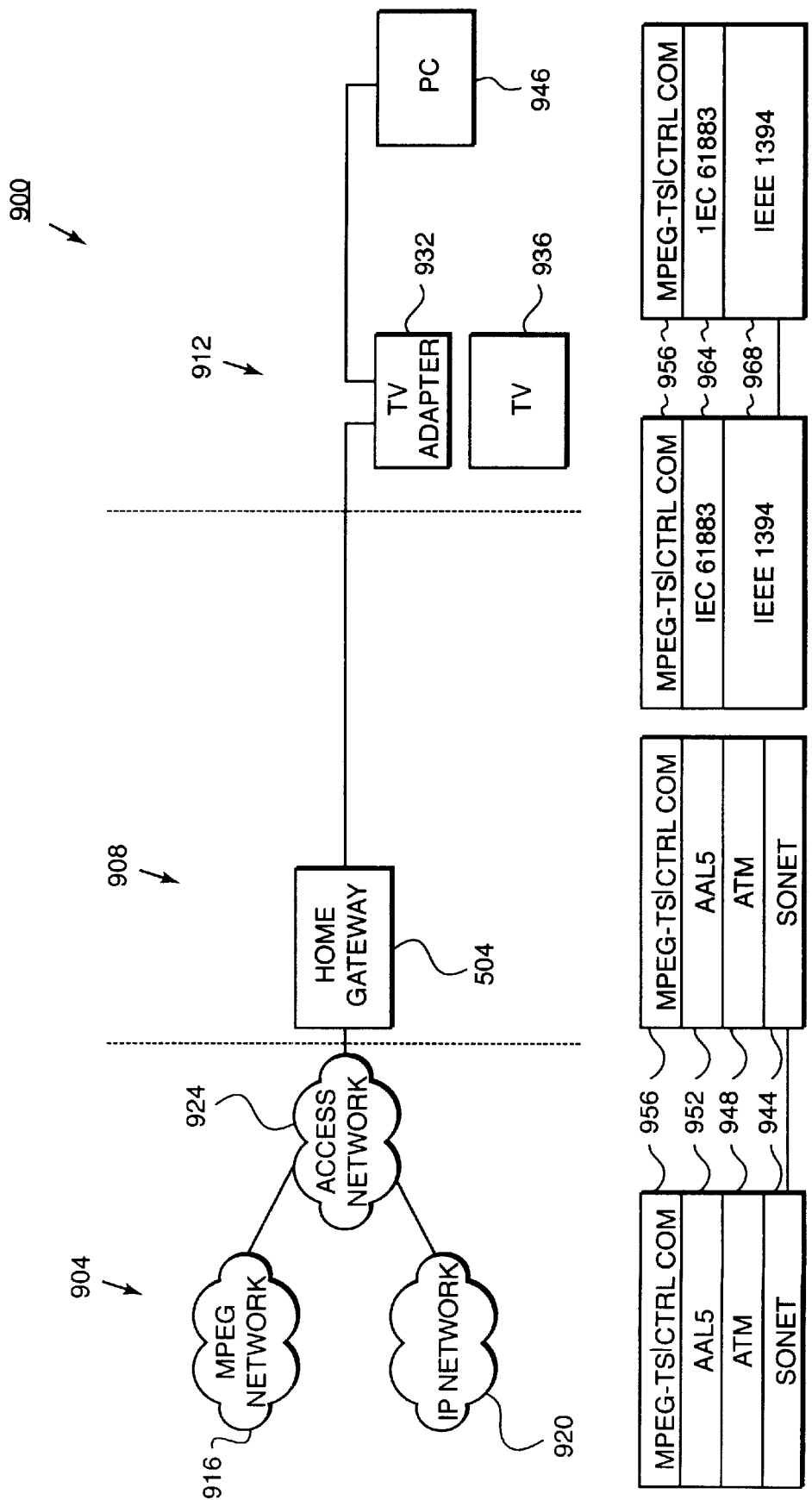
FIG. 9 depicts a protocol stack for MPEG transport over the IEEE 1394-based home entertainment system network of FIG. 5.
Figure 10:
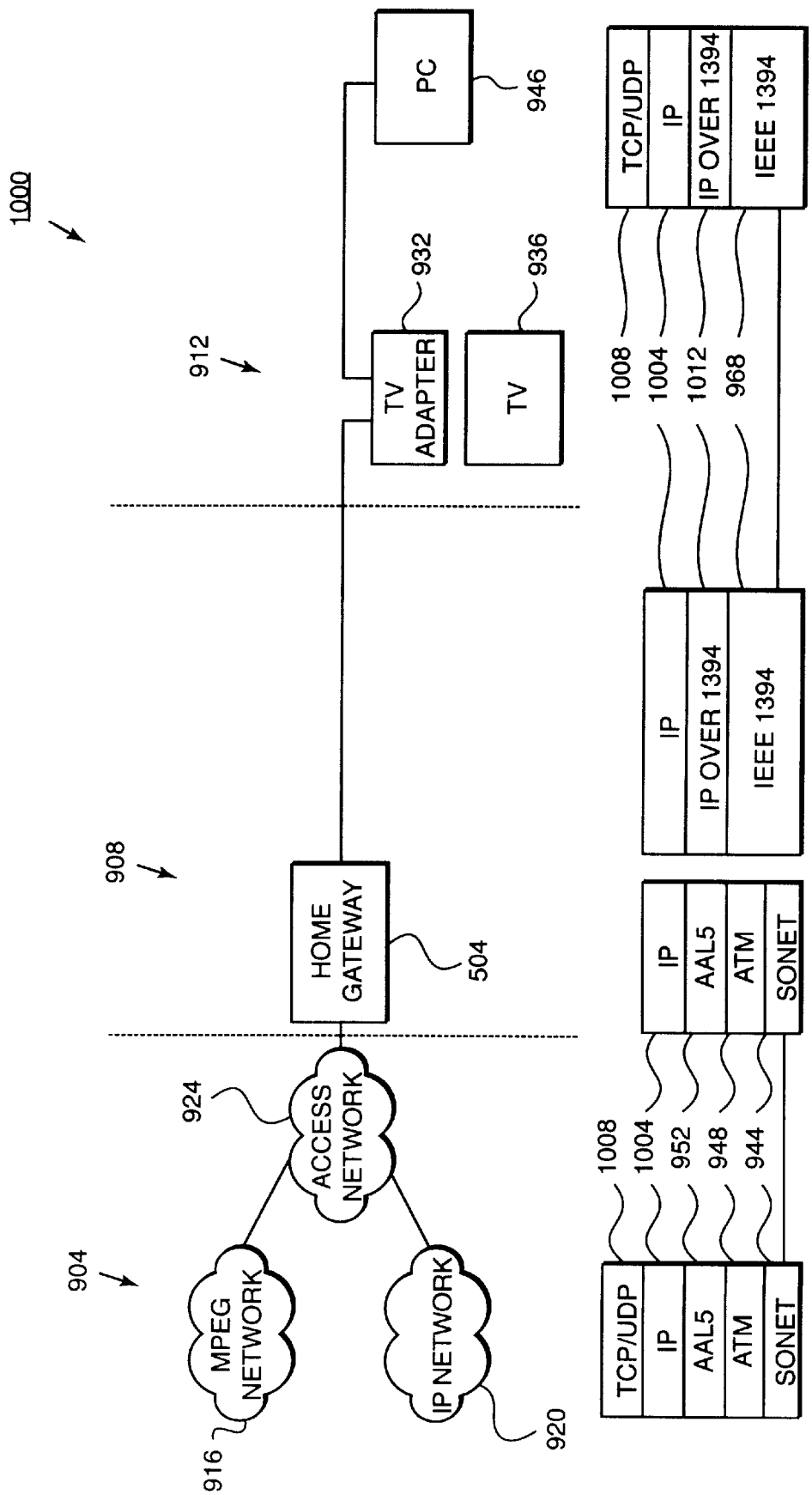
FIG. 10 depicts a protocol stack for IP routing over the home entertainment system network of FIG. 5.
Figure 11:
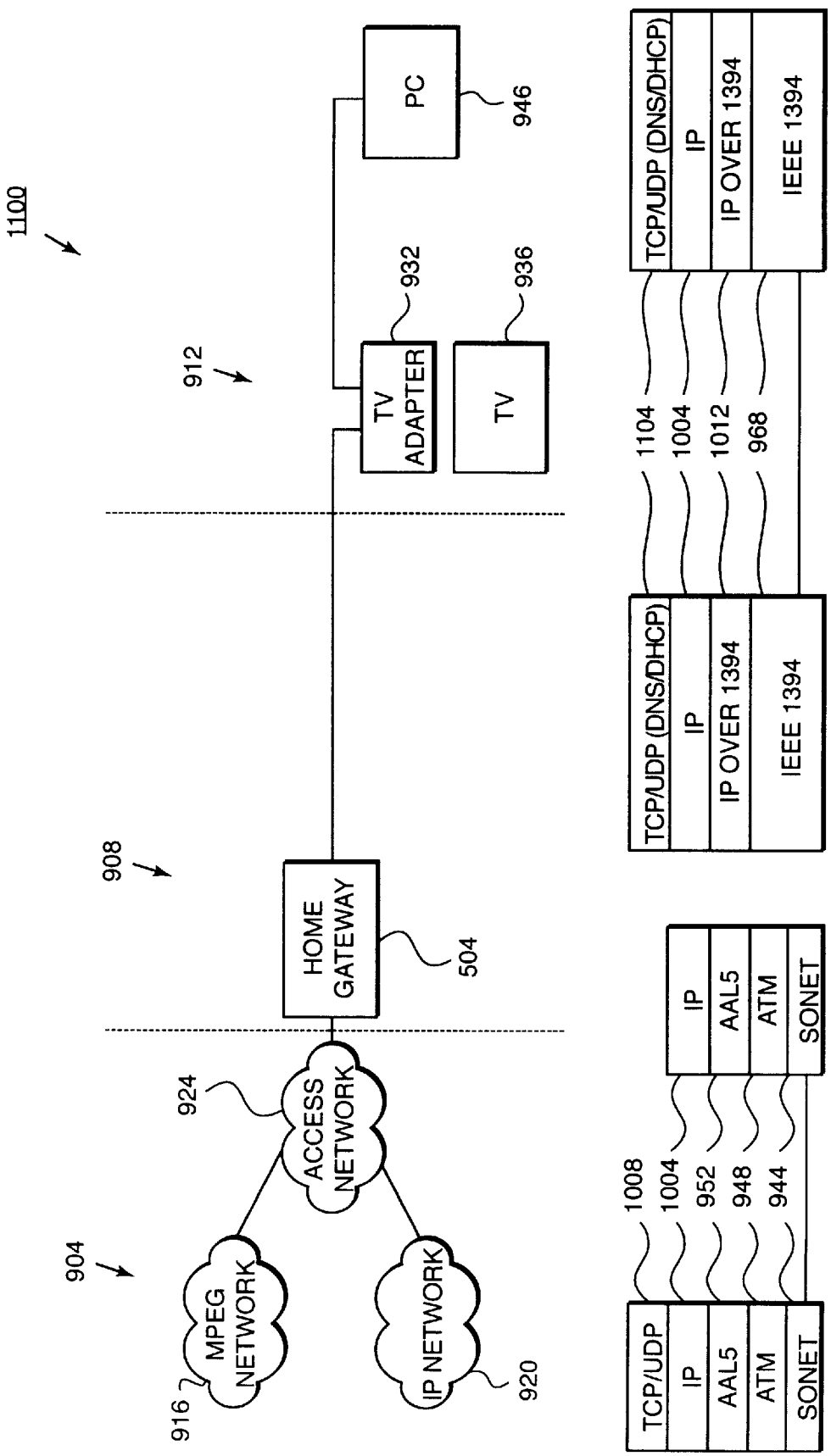
FIG. 11 depicts a protocol stack for IP plug-and-play and DNS/DHCP routing over the home entertainment system network of FIG. 5.
Figure 12:
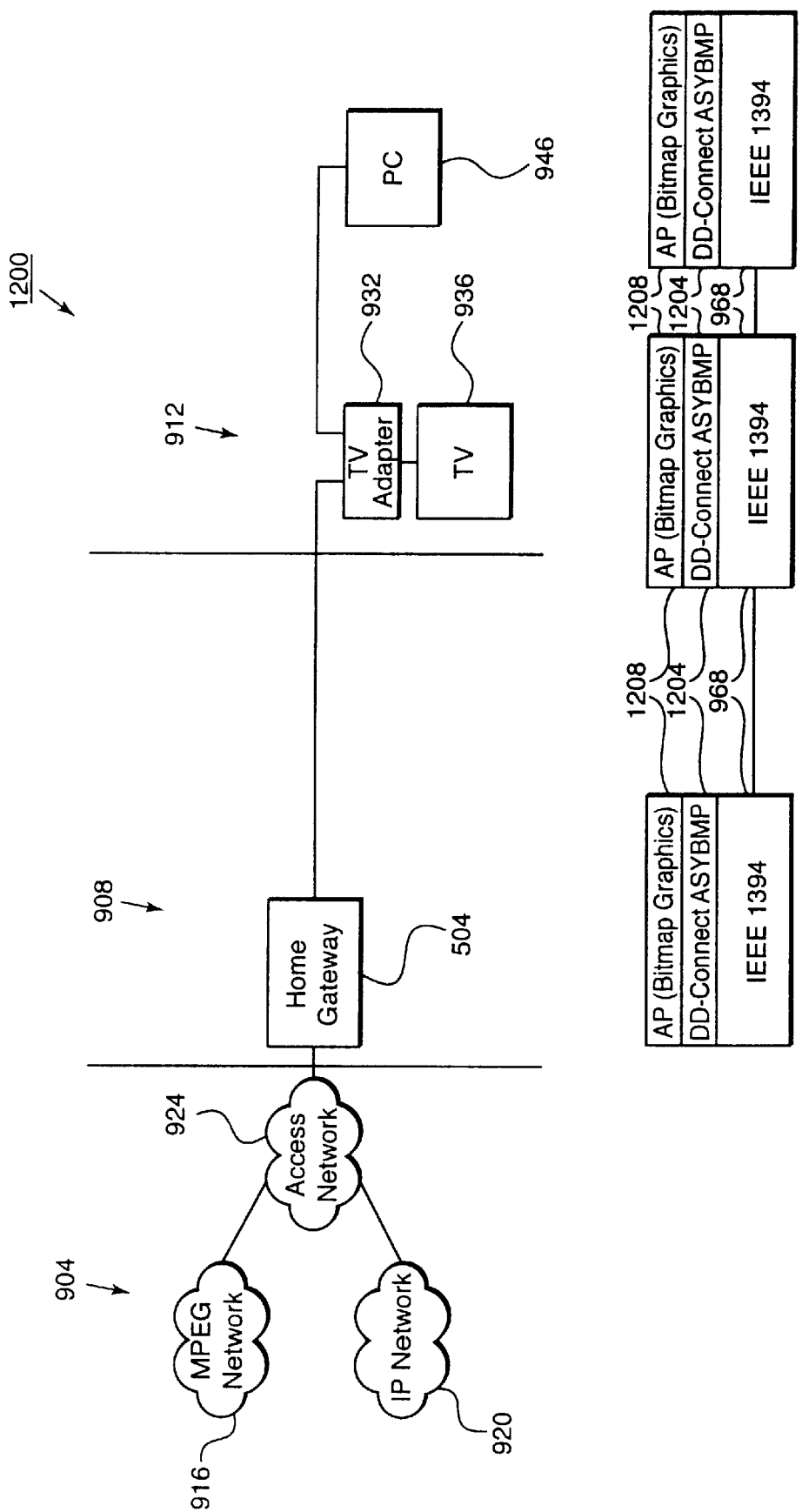
FIG. 12 depicts a protocol stack for bitmap display data transfer between devices of the home entertainment system of FIG. 5.

FIGS. 9 through 12 depict various aspects of the protocol stacks employed between the respective external networks, the home gateway and the internal network(s), which pertain to the home entertainment system network. FIGS. 9–11 pertain to the home gateway 504. FIG. 12 pertains to the protocol stack between home electronic devices located on the home entertainment system network.

Commonly shown in FIGS. 9–12 is an external network 904, a bridge 908, and an internal network (i.e., IEEE 1394 bus) 912. The external network 904 can comprise an MPEG network 916 (e.g., a digital video service provider), and an IP network 920 (e.g., the "Internet"). An access network 924 connects to both the MPEG network 916 and IP network 920. According to one embodiment, the access network 924 is an internet access provider ("IAP") such as, e.g., America Online or @Home. The external network 904 is coupled to the internal network 912 through a bridge 908. The bridge 908 is preferably an home gateway 504. The home gateway 504 converts data and signals from the external network 924 from ATM packets to an IEEE 1394 format, which can be forwarded to the internal network 912. The internal network 912 comprises a television adapter 932 and a standard or high definition television 936 (or alternatively a single unit incorporating a 1394 node and a television) and a personal computer 946. The protocol stacks are depicted in FIGS. 9–12 under the portion of the overall system to which they correspond.

FIG. 9 depicts the protocol stack 900 according to ATM data transmission from an MPEG network 916 to a TV adapter 932.

MPEG data is formatted at the MPEG network 916 from MPEG TS ("transport stream") protocol or control command ("CTRL COM") 956 to ATM adaption layer 5 ("AAL5") 952. From AAL5, the data is converted to ATM data 948, and from ATM 948 it is converted to synchronous optical network "SONET" protocol 944. An ATM network is preferred at the lowest layer, given its high reliability, but in alternative embodiments, a different carrier can be employed (e.g., by replacing the ATM layers).

From the access network 924, data is received at the home gateway 504. At the home gateway 504, the communications from the external network are converted (or "bridged") from an ATM protocol to an IEEE 1394 protocol. Additional protocol layer conversions are shown in FIG. 9, including IEC 61883 964, which formats MPEG data for IEEE 1394 communication and is further described in International Electrotechnical Commission Standard 61883 entitled "Digital Interface for Consumer Audio/Visual Equipment" and which is publicly available from the IEC. IEEE 1394 protocol 968, is described in the IEEE 1394-1995 standard.

From the gateway 908, data is sent via IEEE 1394 protocol to the internal network 912, where it is subsequently converted back into an MPEG transport stream for presentation/playback on a video display unit. It is further possible with TV adapter 932 to convert the data to an analog signal cable of providing audio/visual data to a standard or high definition television set. Preferably, however, TV 936 is capable of supporting MPEG data.

FIG. 10 depicts a protocol stack 1000 according to IP data transmission from IP network 920 to PC 946. The transmission control protocol ("TCP") or user datagram protocol ("UDP") 1008, which are described in publicly available documents Internet RFC 793 and Internet RFC 768 respectively, are layered over internet protocol ("IP") 1004, which is described in Internet RFC 791. This facilitates transmission of packet data from an internet (e.g., the Internet or World-Wide Web). At the home gateway 504 and PC 946, an IP over 1394 protocol 1012, described in Internet Engineering Task Force ("IETF") document "IPv4 over IEEE 1394", by Peter Johansson is employed. The IETF document "Ipv4 over IEEE 1394" is incorporated herein by reference in its entirety. The protocol stack 1000 is especially advantageous for finding or exploring content on the World-Wide Web and Internet.

FIG. 11 illustrates a protocol stack 1100 for TCP/IP data transmission from the IP network 920 to the PC 946. In order to facilitate automatic setup and IP address assignments, the protocol stack 1100 supports a domain name system ("DNS"), as described in Internet RFCs 1034 and 1035, and dynamic host configuration protocol ("DHCP").

FIG. 12 illustrates a protocol stack 1200 for bitmap transfer between devices (e.g., from the home gateway 504 or PC 946 to the TV adapter 932) over the internal network 912. The protocol stack 1200 employs additional and previously non-described protocol "DD-Connect AsyBmp" 1204. The "bitmap transfer" protocol is described in further detail below. The "AP" protocol 1208 is simply the particular protocol used at the application layer (e.g., a display protocol or a mouse protocol).

MPEG Service

Figure 24:
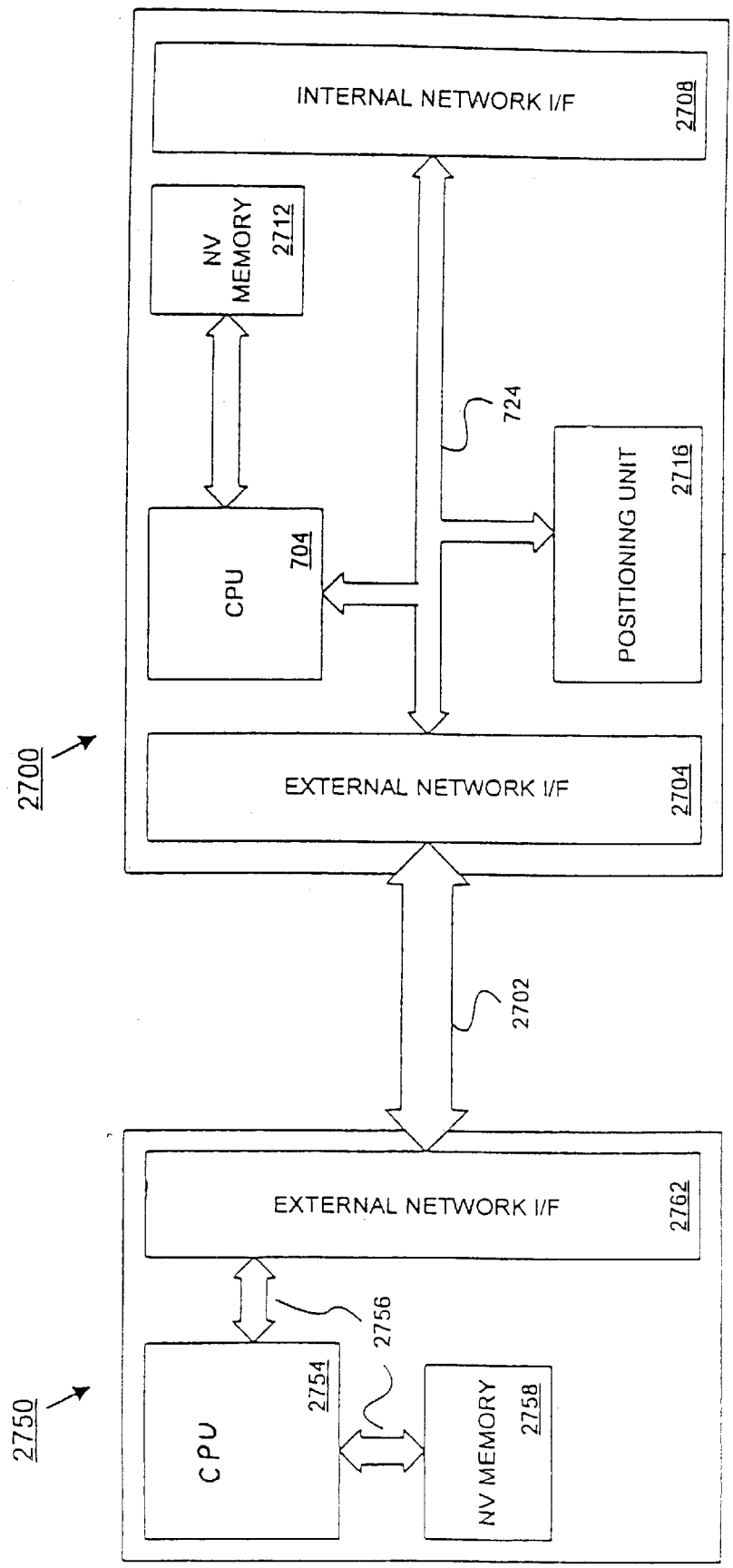
FIG. 24 is a block diagram of a home gateway comprising a positioning unit and a central server.

According to a presently preferred embodiment, the home gateway 504 manages incoming MPEG transport stream service from a video service provider on the MPEG network 916 to an IEEE 1394 node in the IEEE 1394 internal network 912. The MPEG service is handled by ATM driver 816, service controller 808 and IEEE 1394 driver 820 within the home gateway 504. FIG. 24 is a flowchart depicting the acts for processing MPEG data between the external network 904 and the internal network 912.

Figure 21:
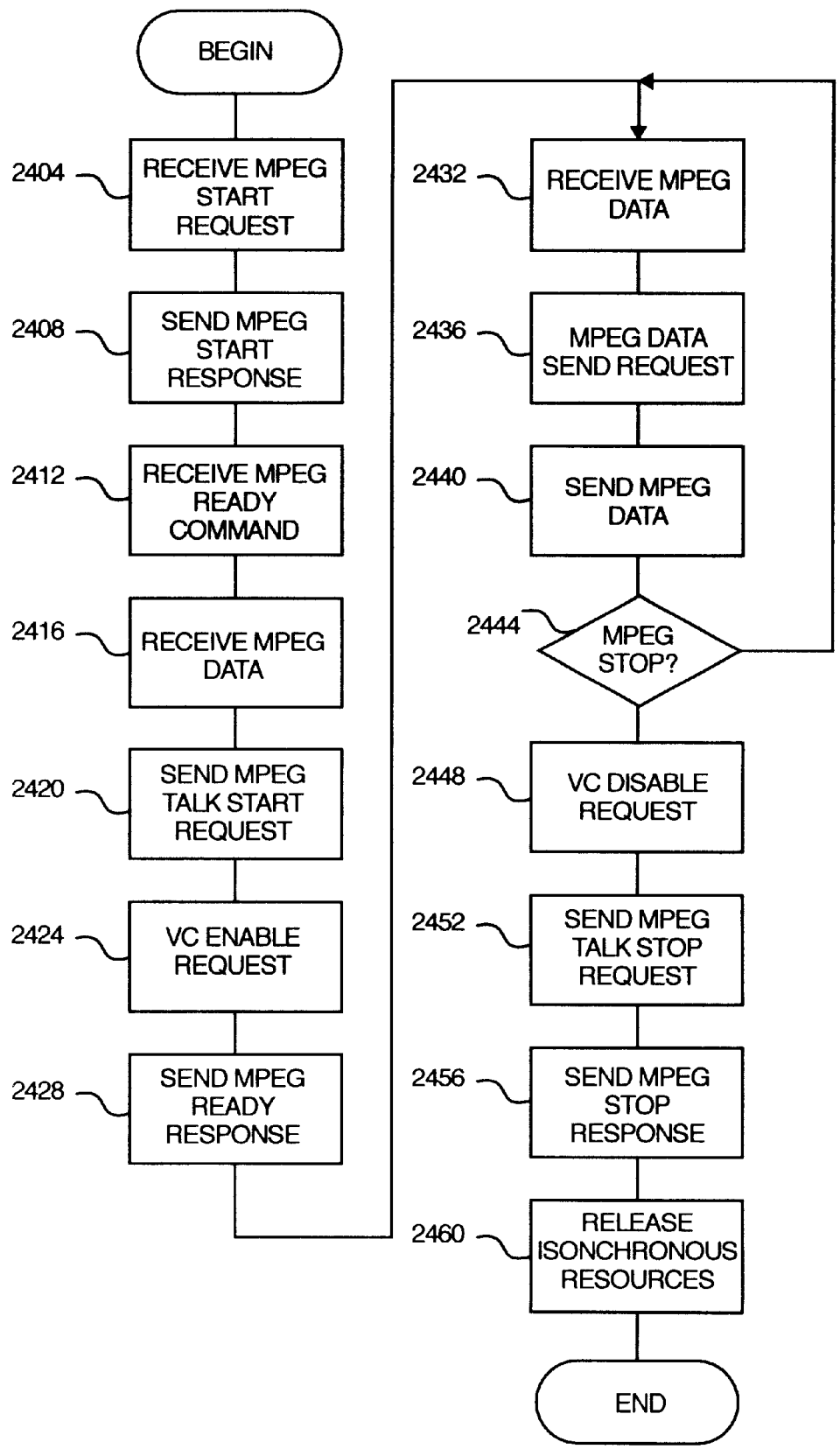
FIG. 21 is a flowchart depicting an MPEG transport stream processing service.

Turning to FIG. 21, at act 2404, an asynchronous write request is received at the IEEE 1394 driver 820 from an IEEE 1394 node. The asynchronous write request comprises an MPEG START REQUEST command. The MPEG START REQUEST command is passed from the IEEE 1394 driver 820 to the service controller 808, at which point isochronous resource allocation begins. In act 2408, an asynchronous write request comprising an MPEG START RESPONSE is sent from the service controller 808 to the IEEE 1394 driver 820, and then from the IEEE 1394 driver 820 to the target IEEE 1394 node.

Next, in act 2412, an asynchronous write request comprising an MPEG READY command is received at the IEEE 1394 driver 820. The MPEG READY command is passed from the IEEE 1394 driver 820 to the service controller 808. MPEG data is received at the ATM driver 816 at act 2416. Although act 2416 is shown after act 2412, it is possible that the MPEG data was received before act 2412. The MPEG data is received over an AAL5 connection with the video service provider on the MPEG network 916.

At act 2420, the service controller requests the 1294 driver 820 to enable isochronous transmission over the pre-allocated isochronous channel by sending an MPEG TALK START request. In act 2424, the service controller 808 sends a VC ENABLE request to the ATM driver 816 to request an isochronous virtual channel ("VC"). Next, in act 2428, an asynchronous write request comprising an MPEG READY response is sent from the service controller 808 to the 1394 driver 820, from which it is then sent to the target IEEE 1394 node.

In act 2432, an MPEG data is received at the ATM driver 816. In act 2436 an MPEG DATA SEND request is passed from the ATM driver 816 to the IEEE 1394 driver 820. Next, in act 2440, the MPEG DATA SEND request is followed by MPEG data. MPEG data is then routed to the target IEEE 1394 node. At act 2444, the service controller 808 performs a test to determine whether an asynchronous write request comprising an MPEG STOP command has been received from the target IEEE 1394 node. If the test at act 2444 is negative, then processing continues to act 2432 described above. If the test at act 2444 is positive, meaning an MPEG STOP command was received, then processing continues to act 2448.

At act 2448, the service controller 808 passes a request to the ATM driver 816 requesting to disable (or close) the isochronous virtual channel. At act 2452, the service controller 808 sends a MPEG TALK STOP response to the IEEE 1394 driver. Finally, at act 2460, the isochronous resources are released, wherein an MPEG STOP response is sent from the service controller 808, through the IEEE 1394 driver 820 and then to the IEEE 1394 node.

IP Service

In a presently preferred embodiment, the home gateway 504 further manages IP service to and from IEEE 1394 nodes on the IEEE 1394 internal network 912 and the external network 904. For the purpose of illustration, the external network 904 is described as communicating via an asynchronous transfer mode ("ATM") protocol, since it is preferred. However, alternative embodiments of the invention allow for communication via non-ATM protocols too, such as IP through an internet access provider or internet service provider (e.g., transmission control protocol "TCP"), a cable modem, asynchronous digital subscriber line, or other equivalent communication protocol.

Figure 22C:
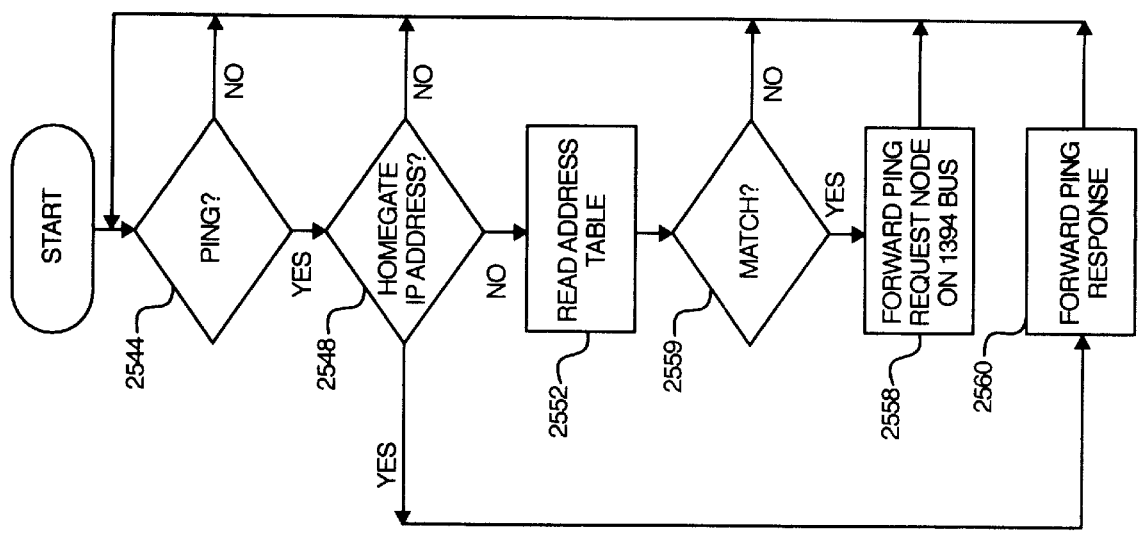
FIGS. 22A–C are flowcharts depicting various functions and processes of the IP service aspect of an embodiment of the present invention.
Figure 22B:
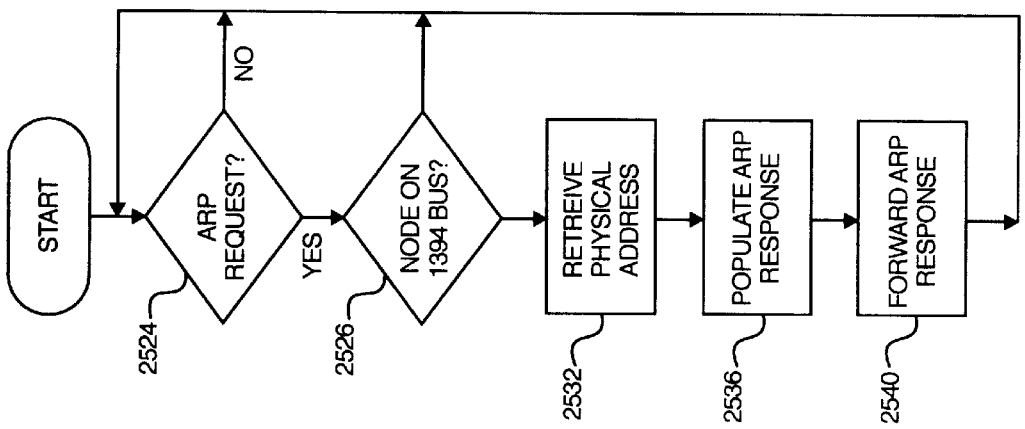
Figure 22A:
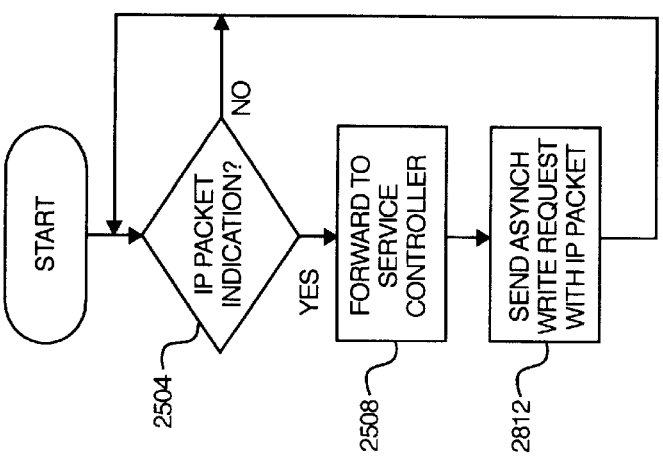

FIGS. 22A–C are flowcharts depicting the acts for IP service support. More particularly, FIG. 22A depicts general IP packet support for IP routing or forwarding, FIG. 22B depicts ARP (address resolution protocol) support, and FIG. 22C depicts IP packet "ping" support. The IP support services described herein are event (or interrupt) driven support algorithms and begin upon receipt of a trigger, for example the receipt of an IP packet at the ATM driver 816. Publicly available Internet Architecture Board documents RFC 791, 826 and 2151 describe, respectively, further information concerning the IP packet handling, ARP and ping request handling. These documents are incorporated herein by reference in their entirety. Accordingly, the information provided hereafter concerning the IP service of the home gateway 504 is designed to be a general overview of its manner of operation.

FIG. 22A is a flowchart depicting the acts for handling IP packets for routing or forwarding. At act 2504, an IP packet received at the ATM driver 816 is tested to determine whether it contains an IP packet indication. If the packet does not contain an IP packet indication, then the routine will stop until a next IP packet is received. However, if the packet does contain an IP packet indication, then processing continues to act 2508, wherein the ATM driver 816 forwards the IP packet indication to the service controller 808. The service controller 808 reads the address mapping table 1600 (described in detail with reference to FIG. 16) and matches the destination IP address contained in the IP packet with a corresponding IEEE 1394 node.

The home gateway 504 formats the IP packet for routing to the destination IEEE 1394 node. To this end, in act 2512, an asynchronous WRITE REQUEST is initialized with an IP packet and passed from the service controller 808 to the IEEE 1394 driver 820, and then from the IEEE 1394 driver 820 to the destination IEEE 1394 node. Since the aforementioned process is event driven, the present iteration is finished after act 2512, so the process returns to a "waiting" mode, where the IP service routine waits for a next IP packet.

FIG. 22B depicts acts for processing an address resolution protocol ("ARP") request. ARP is a protocol for finding a physical address (e.g., Ethernet address) from an Internet address. Generally, a requester broadcasts an ARP packet comprising the Internet address of another host and then waits for the other host to send back its representative physical address. The home gateway 504 maintains the address mapping table 1600, which is used, in part, to this end. When an ARP request is received at the home gateway 504, the home gateway 504 can return a physical address by querying the address mapping table 1600 and finding a physical address corresponding to the received IP address. This ARP request response is possible even though the IP address is not necessarily the home gateway 504 IP address. Indeed, the IP address is more likely to be the IP address of personal computer (e.g., personal computer 524) residing on the IEEE 1394 bus 568.

Turning to the acts depicted in FIG. 22B, in act 2524, the packet is tested to determine whether it comprises an ARP request. If the packet does not contain an ARP request, then the process returns to act 2524. Notably, act 2524 is performed based on an event trigger-receiving a packet; it is not a constant polling. If the packet does contain an ARP request, then processing continues to act 2528.

In act 2528, the ARP request is passed from the ATM driver 816 to the service controller 808. The service controller reads the address mapping table 1600 to determine whether the IEEE 1394 node identified by the Internet address in the ARP resides on the IEEE 1394 bus 568. If the IEEE 1394 node identified by the Internet address does not reside on the IEEE 1394 bus 568, the present iteration of the process ends. However, if the IEEE 1394 node does reside on the IEEE 1394 bus 568, then the physical address of the IEEE 1394 node is retrieved from the address mapping table 1600 in act 2532.

In act 2536, the physical address is populated into an ARP response, and in act 2540, the ARP response is forwarded from the service controller 808 to the ATM driver 816, and then from the ATM driver 816 to the. external network 904. The present iteration of the process ends after step 2540, so the processing will begin (i.e., on its next iteration) at act 2524.

FIG. 22C depicts steps for processing a "ping". A ping is an echo request that is used to determine whether a particular device is "on-line" or "live". The "ping" process is known in the art, nevertheless, a high-level overview is described herein for illustration purposes.

In act 2544, the IP packet is tested to determine whether it contains a "ping" request directed to the home gateway 504. If the IP packet does not contain a ping request for the home gateway 504, then the iteration ends and the process returns to act 2544 (similar to acts 2504 and 2524 above). However, if the IP packet does contain a ping request for the home gateway 504, then processing continues to act 2548.

In act 2548, the ping request is passed from the ATM driver 816 to the service controller 808, where the IP address contained in the ping request is tested against the home gateway 504 IP address. If the two IP addresses match, then processing continues to act 2560, described below. If the two IP addresses do not match, then processing continues to act 2552.

In act 2552, the service controller 808 reads the IP addresses contained in the address mapping table 1600. In act 2556, a test is performed to determine whether there is a match between the incoming IP address contained in the ping request and any IP address in the address mapping table 1600. If there is no match as a result of the test at act 2556, then the iteration terminates and processing returns to act 2544 (note that no response to the ping is given in this instance).

If, however, a match between the two IP addresses does exist, then processing continues to act 2558, where the ping request is forwarded to a particular node on the 1394 bus. The particular node will respond appropriately to the ping request. Accordingly, the process returns to act 2544.

In act 2560, a response to the ping request is generated by the service controller 808, passed to the ATM driver 816 and then forwarded to the external network 904. Processing of the ping request terminates and a next iteration can be processed once a new ping request is received.

Address Mapping

Figure 13:
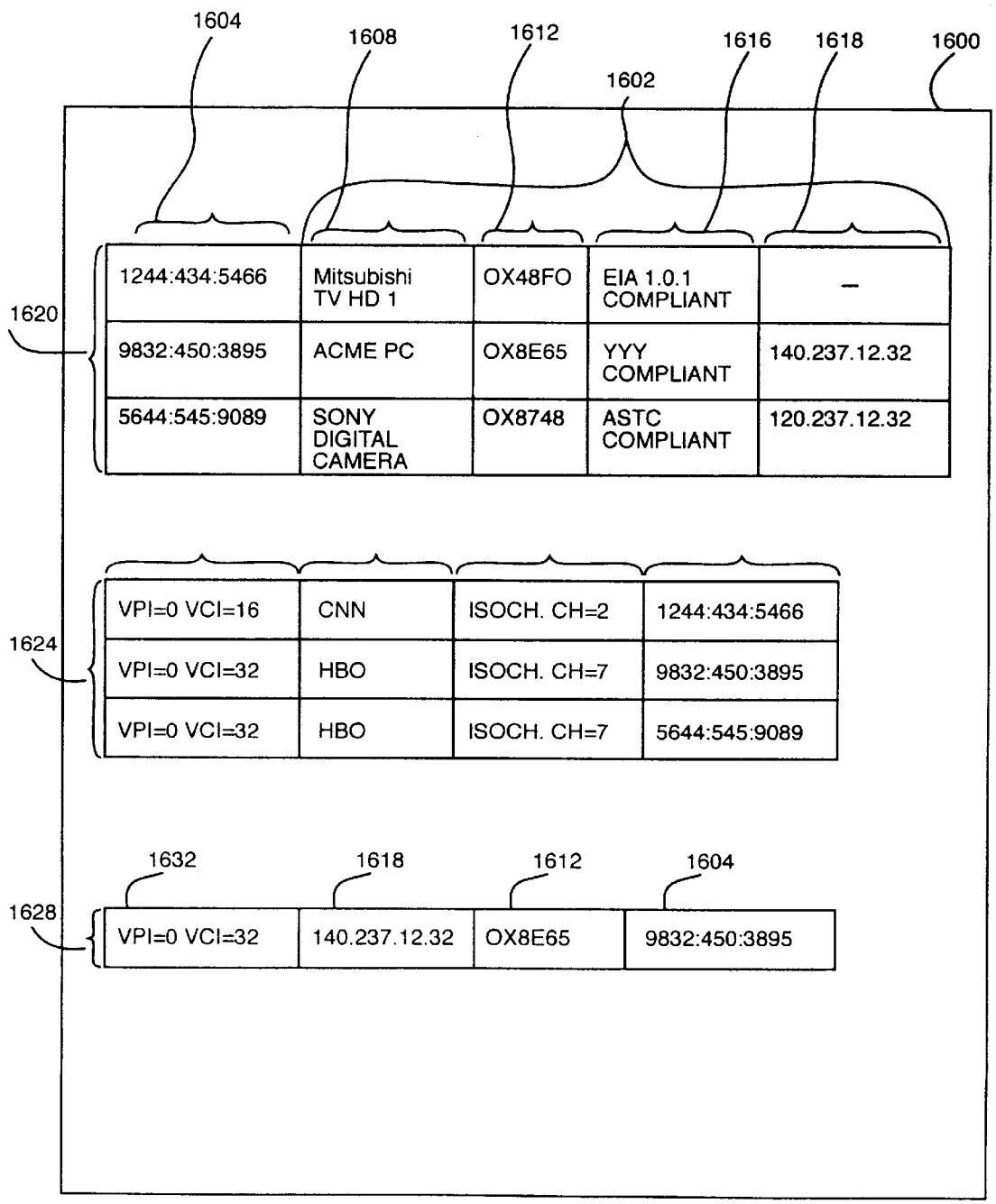
FIG. 13 depicts an address mapping table.

FIG. 13 depicts an exemplary address mapping table 1600. The address mapping table 1600 preferably comprises at least four columns and as many rows as there are devices on the home entertainment network 500. The address mapping table 1600 is preferably partitioned into three distinct sections. The first section 1620 comprises IEEE 1394 service data, the second section 1624 comprises MPEG service data, and a third section 1628 comprises IP service data. Each section has its own "mini-table" for information, although the address mapping table 1600 is physically a single table.

In the IEEE 1394 section 1620, the first column is the node unique ID column 1604, the node unique ID is permanently encoded into the hardware or ROM of the node 104. The next group of columns are node attribute columns 1602. The node attribute columns include a common name column 1608, which identifies a particular node by a user selected/programmed name that is stored in the node, a node_ID column 1612, which contains a dynamically assigned 16-bit node_ID, a node type column 1616, and an IP address column 1618.

In the MPEG service section 1624, the first column is the ATM VPI/VCI column 1632, the next column is the program information column 1636, the third column is the IEEE 1394 isochronous channel column 1640 and the last column is the node unique ID column 1604.

In the IP service section 1628, the first column is the ATM VPI/VCI column 1632, the next column is the IP address column 1618, the third column is the node_ID column 1612, and the last column is the node unique ID column 1604.

The address mapping table 1600 is created by the IEEE 1394 driver (e.g., IEEE 1394 driver 816 shown in FIG. 8) when a bus reset occurs. The IEEE 1394 driver receives a response from each node in the IEEE 1394 bus (e.g., IEEE 1394 bus 568 shown in FIG. 5) identifying the node's node unique ID and other information. Based on the information received from the node, the IEEE 1394 driver adds the node unique ID to the address mapping table 1600 and then queries the particular node for additional information (e.g., common name, node capabilities and IP address). The IEEE 1394 driver assigns a valve to node_ID column 1612 for the node.

Figure 19:
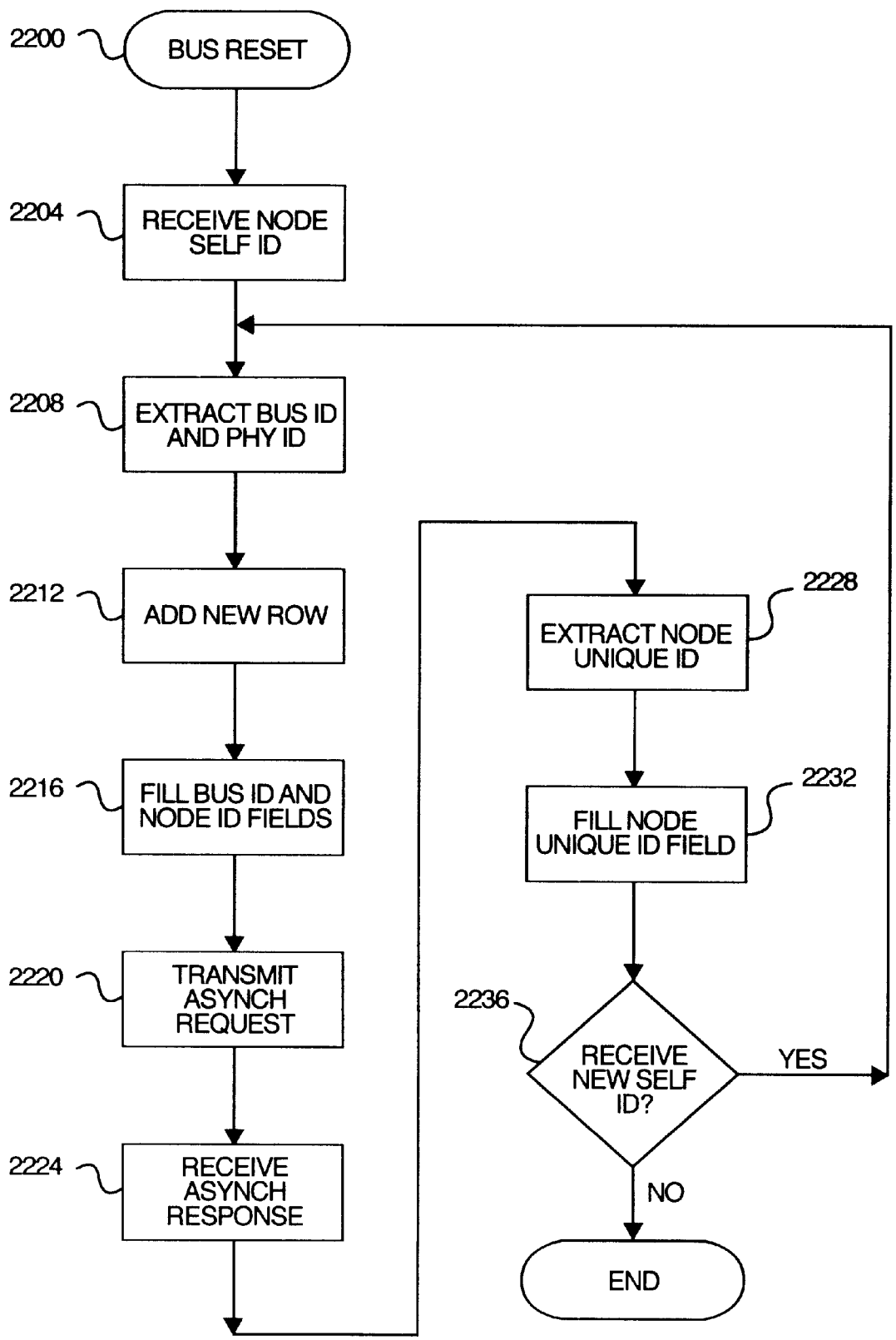
FIG. 19 is a flowchart depicting the acts for generating and maintaining an address mapping table.

FIG. 19 is a flowchart depicting the acts for generating and maintaining the address mapping table 1600. The acts are performed by a "managing node" residing on the home entertainment network system 500 and, more preferably, the acts are performed by the home gateway 504. The node managing the address mapping table 1600 is generally pre-selected. However, it can be dynamically changed either in response to a bus reset, or by express instruction from a user. In either event, the functionality for generating and maintaining the address mapping table 1600 is embedded into the IEEE 1394 driver 820.

At the outset of the address mapping process, a trigger is received which causes the address mapping table 1600 to be generated. The trigger is either an internal or external trigger, relative to the managing node, such as a bus reset command. The bus reset can occur as a result of an explicit instruction from the application layer, or by an implicit instruction from the firmware—such as in response to the IEEE 1394 driver 820 detecting a new node added to the home entertainment network system 500. The trigger is shown as a bus reset in FIG. 19, act 2200.

After receiving a trigger, the processing continues to act 2204, where a self-identification packet is receiving by the managing node. The self-identification packet comprises sixteen-bit address information referred to above as a "node_ID". The node_ID, more particularly the ten-bit bu_ID and the six-bit physical_ID, is extracted from the self-identification packet at act 2208.

In act 2212, a new row is added to the address mapping table 1600. The data extracted at act 2208 is filled into the bus_ID and physical_ID fields in act 2216. In a preferred embodiment, the two fields are a single sixteen-bit address space—i.e., the node_ID column 1612.

In act 2220, the managing node prepares and transmits an asynchronous read request addressed to the node identified by the node_ID received at act 2204. In response to the asynchronous read request, the managing node receives an asynchronous read response at act 2224. The asynchronous read response comprises at least a node unique identifier ("ID") and preferably also comprises additional node attribute information, such as an IP address, a node type, and a common name.

In act 2228, the node unique ID and, according to a presently preferred embodiment, the additional node attribute information, are extracted from the asynchronous read response received at act 2224. In act 2232, the node unique ID is filled into the node unique ID column of the address mapping table 1600. In a preferred embodiment, the additional node attribute information is also filled into a corresponding column of the address mapping table 1600. In the event that a partitioned address mapping table 1600 is used, the rows of the address mapping table 1600 are logically separated corresponding to the type of service the data in the row pertains to, for example, IEEE 1394 service, ATM service, or MPEG service. In such an embodiment, the node attribute information identifies which partition the node information corresponds to. In another embodiment, redundant data is stored in mini service tables within the primary address mapping table 1600.

Finally, in act 2236, a test is performed to determine whether any new node self-ID packets have been received by the managing node. If any new node self-ID packets have been received, then processing continues to step 2208. If no new node self-ID packets have been received, then processing ends.

In the broader spirit of the invention, the steps described above can be handled in a batch mode, wherein after a bus reset (i.e., act 2200), a collection period elapses during which node self-ID packets are received and queued into a list in memory by the managing node. In such an embodiment, the processing of node self-IDs and the attainment of node unique IDs and node attribute information can be handled from the queued list in an incremental fashion. The test, therefore, in act 2236 becomes whether any additional self-ID packets need to be processed.

When a command directed toward a particular node in the home entertainment network system 500 is received, the command is related to the particular bus_ID and a physical_ID (or node_ID) using the address mapping table 1600. The managing node then uses the particular bus_ID and physical ID to address (or direct) the received command to a particular node in the home entertainment network system 500.

Command and Control Transfer

Figure 14:
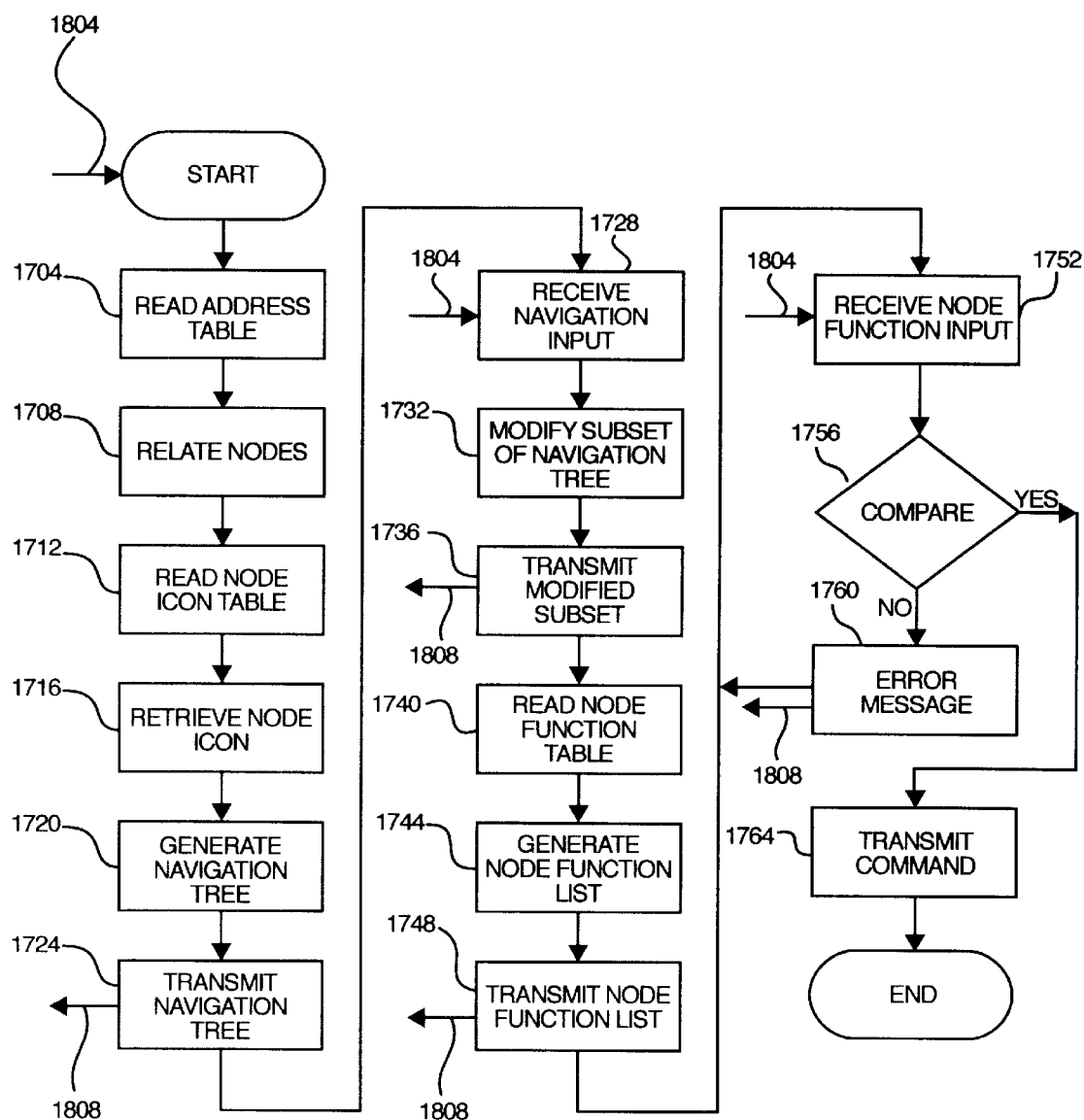
FIG. 14 is a flowchart depicting a preferred command and control transfer protocol.
Figure 15:
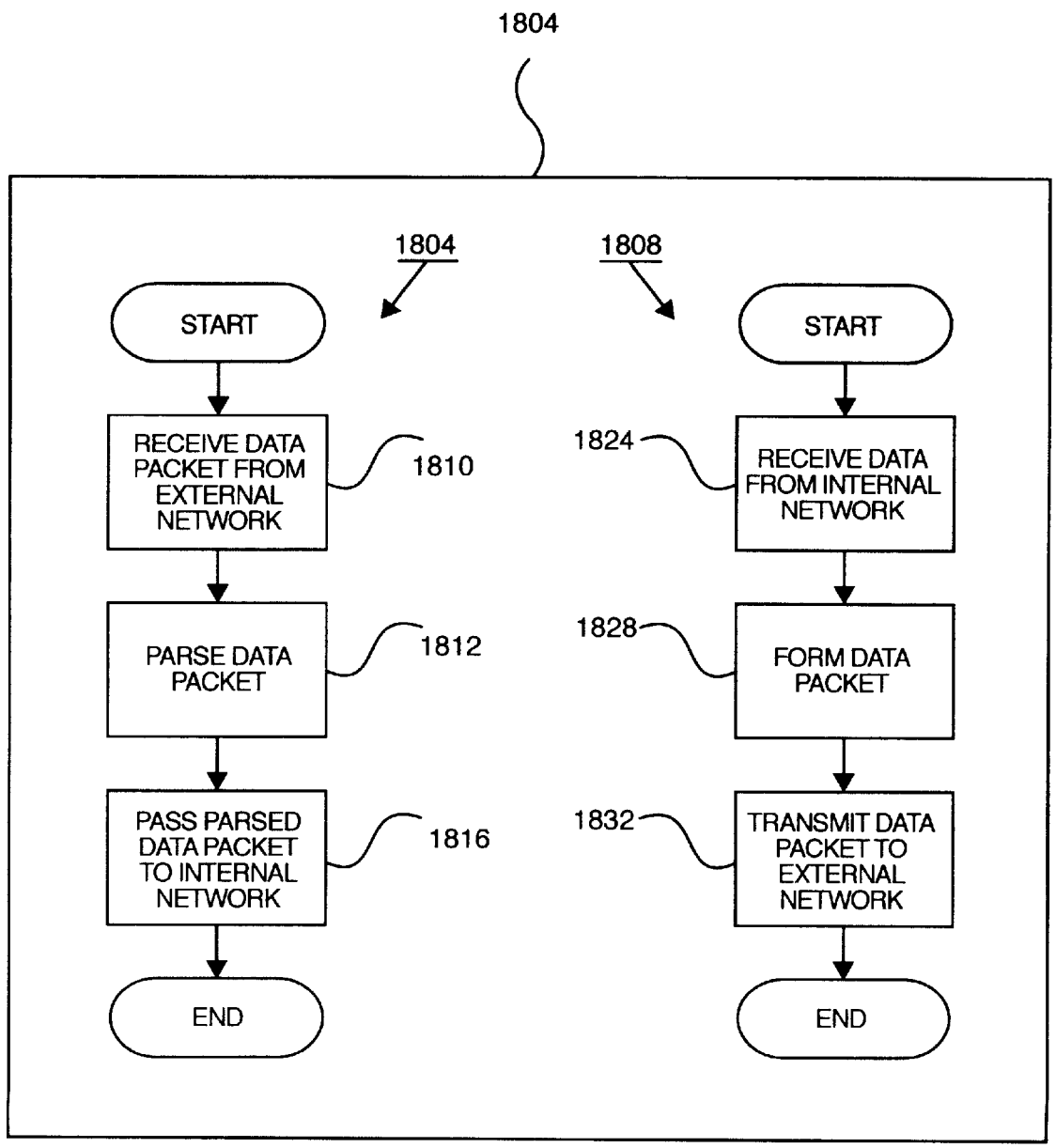
FIG. 15 depicts flowcharts pertaining to a data packet engine.
Figure 16A:
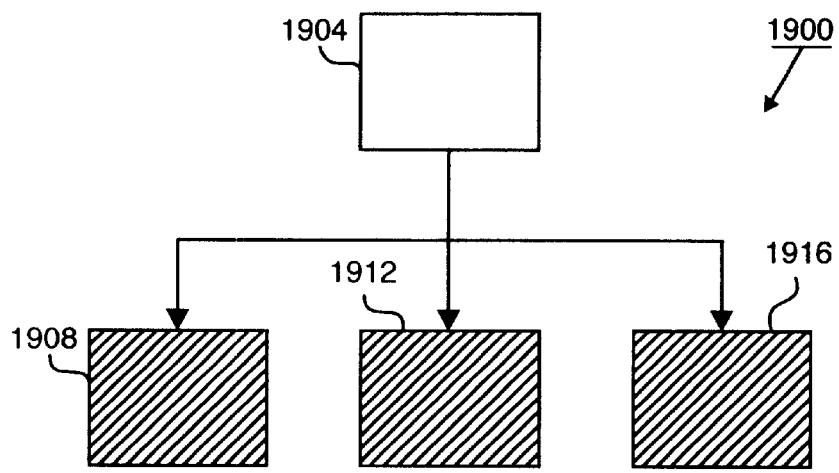
FIGS. 16A–B depict a node navigation tree according to an embodiment of the present invention.
Figure 16B:
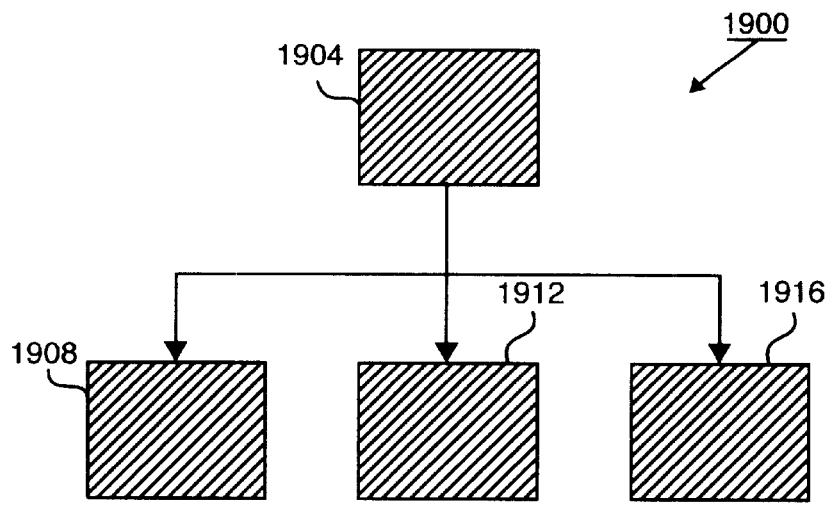
Figure 16C:
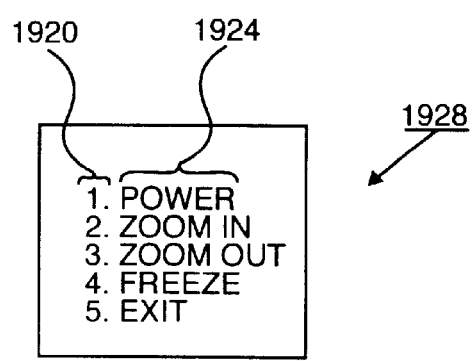
FIG. 16C depicts a node function list according to an embodiment of the present invention.
Figure 17:
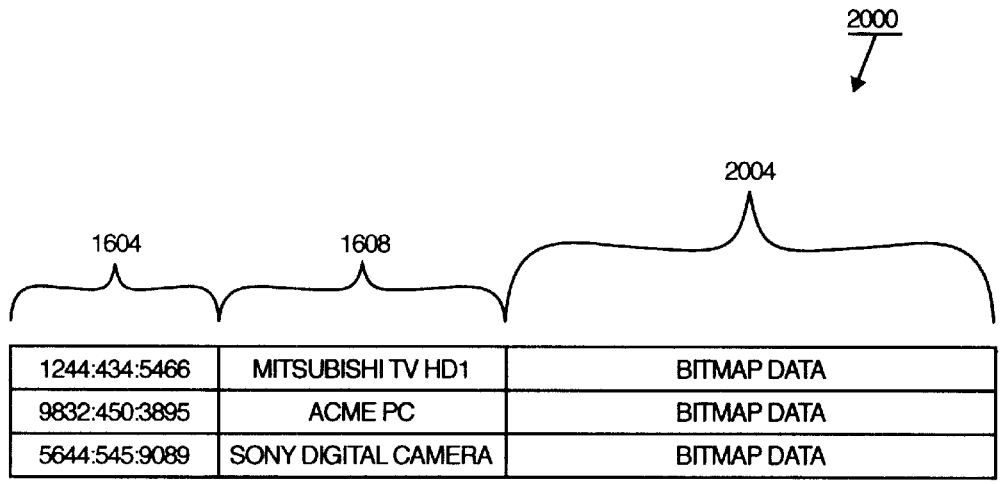
FIG. 17 depicts a preferred node icon table.

FIGS. 14–17, depict aspects of command and control transfer according to a presently preferred embodiment of the present invention. Moreover, FIGS. 14 and 15 are flowcharts illustrating the steps for command and control transfer and packet data handling, respectively, whereas FIGS. 16A–C depict an embodiment of the display information that is created on a video display unit as a result of the steps depicted in FIGS. 14 and 15. FIG. 17 illustrates a node icon table.

To begin the command and control transfer process, a trigger is received. For example, a trigger can include a "menu" button on a remote control that initiates the command and control transfer process, or a stored procedure in a device residing in the home entertainment network 500. As shown. in FIG. 14, a packet engine output from process 1804 (described below with reference to FIG. 15) can initiate the acts for command and control transfer.

Act 1704 includes reading the address mapping table 1600. Once the address mapping table 1600 is read, a node icon table is read in act 1708.

The node icon table has no less than two columns and identifies an image for each device on the home entertainment network 500. The first column represents a node (for example, either a node unique ID or a node type), and the second column represents the node's icon. It is, however, possible to have additional columns in the table, such as a node type, and a node unique ID. Accordingly, if a particular node's icon is desired, the first the node icon table is scanned for the node's unique ID, if the node unique ID is not found, then the node icon table is scanned for the desired node type (e.g., the node can be compliant with a particular device standard). When a matching node unique ID or, alternatively, a matching node type is found, then the icon for the desired node is retrieved at act 1716.

An embodiment of a node icon table is depicted in FIG. 17. The node icon table 2000 includes node unique ID column 1604, a node type column 1608, and a bitmap data column 2004. The bitmap data column holds approximately 4 kB of data for the node icon. In one embodiment, data for a single icon is contained in the node icon table 2000, however, in an alternative embodiment, data for two icons is contained in the node icon table 2000: one icon is an "inactive" icon, meaning the icon displayed when the node is not selected, and the second is an active node icon, meaning the icon displayed when the node is selected.

In act 1720, a complete node navigation tree is generated. The node navigation tree is depicted in FIGS. 16A–B. In FIG. 16A, the node navigation tree 1900 comprises a control node represented by icon 1904. The control node is the node through which a user is communicating. Destination nodes are represented by icons 1908, 1912 and 1916. As depicted in FIG. 16A, control node's icon 1904 is in active mode, whereas the destination nodes'icons 1908, 1912 and 1916 are in inactive mode. When additional nodes are added to the home entertainment system 500, the number of destination node icons will increase. Similarly, when existing nodes are removed from the home entertainment system 500, the number of destination node icons will be reduced accordingly.

The node navigation tree 1900 is transmitted to the video display unit at act 1724. According to one embodiment, the node navigation tree 1900 is output to a packet engine 1800, where it is processed as an input to process 1808 (described below with reference to FIG. 15).

In act 1728 a navigation input is received. Again, the navigation input can be received from an input device within the internal network 912 (FIG. 9), or it can be received from the external network 904, such as through the packet engine process 1804. Based on the input received in act 1728, a particular destination node will be identified. The control node retrieves the icon information (e.g., the active mode graphic) from the node navigation table 1600, and, in act 1732, modifies a subset of the navigation tree 1900. In an alternative embodiment, standard active mode data, such as a highlighted border or ring, is added to the portion of the navigation tree 1900 representing the selected destination node, thus, retrieval of active mode icon data from the address mapping table 1600 is not required. Based upon the active mode data, a portion, or subset of the node navigation tree 1900 is modified. The portion of the node navigation tree 1900 modified can include modified data corresponding to the "newly" selected active node, or it can additionally include modified data corresponding to the node which has been switched from active mode to inactive mode. According to a presently preferred embodiment, both data concerning the new active node icon and the old active node icon are modified.

FIG. 16B depicts the node navigation tree 1900 after the destination node corresponding to icon 1916 has been selected as the active node. The portion of the node navigation tree 1900 that has been modified is the subset of data corresponding to icons 1904 and 1916. In act 1736 the modified subset of the node navigation tree 1900 is transmitted to the video display unit. In an alternative embodiment, the modified subset of the node navigation tree 1900 is passed to the packet engine 1800 and routed to the external network 904 by process 1808.

An optional intermediate act can occur between acts 1736 and 1740. The optional step is confirming from the user that the destination node that was navigated to in act 1728 is in fact the desired destination node. This act is simply receiving another input, such as an "ENTER" command after navigation to the desired destination icon.

Figure 18:
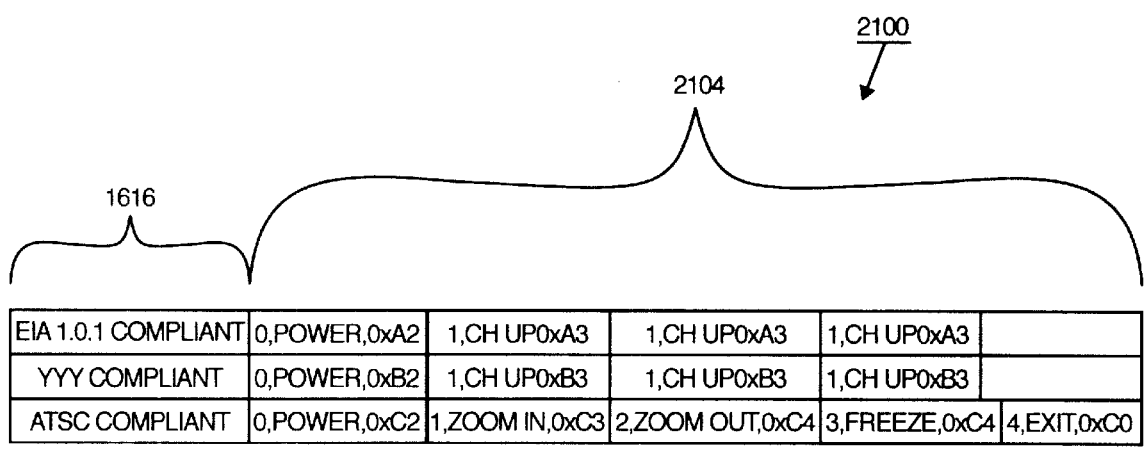
FIG. 18 depicts a node function table.

In act 1740 the node function table is read. FIG. 18 depicts a node function table 2100. The node function table 2100 preferably comprises two columns, a node type column 1616 and a function list column 2104. The function list column 2104 comprises a plurality of entries, each entry 2108 comprising a mapping of single character alphanumeric inputs, a corresponding function name and an op code. When the controller reads the node function table 2100, the node function table 2100 is scanned for the particular active destination node type and the corresponding entries 2108 containing the valid commands for the active destination node. The valid commands are retrieved in act 1740.

In act 1744 a node function list, based on the data retrieved from act 1740 is generated. The node function list is then transmitted to the video display unit in act 1748. Again, transmission to the video display unit can also include sending the outgoing node function list to the packet engine for processing and routing by process 1808.

FIG. 16C depicts a node function list 1928 as presented on the video display unit. The first column of the node function list 1928 represents an input value column 1920. The second column, text column 1924, represents text corresponding the adjacent input value, the text describing the function that will result if the adjacent input value in column 1920 is received by the controller.

In act 1752 a node function input is received at the controller. The input can come over the IEEE 1394 bus 568, or it can come from an external network 904, in which case the node function input is directed to the controller by packet engine 1800. The node function input is compared against valid input values 1920 in act 1756, and if the node function input matches a valid input value 1920, then the controller continues to act 1764. If, however, the node function input does not match a valid input value 1920, then the controller continues to act 1760, where an error message (e.g., "invalid command, please re-enter") is transmitted to the video display unit (or packet engine 1800 ). From act 1760, processing continues to act 1752. Alternatively, processing can continue to step 1748, such that the video display unit can be refreshed.

Finally, the input value 1920 received at the controller is mapped to a function in the node function list 1928. A command is formatted with an appropriate op code and is transmitted to the destination node in act 1764. After act 1764, the command and control transfer method is complete.

Packet Engine

FIG. 15 depicts packet engine 1800. According to one embodiment, packet engine 1800 is a software bridge/router that receives and formats data for and from the internal network 912 and the external network 904. However, packet engine 1800 can also be implemented in hardware alone, or a combination of hardware and software. The steps for passing a data packet from the external network 904 to the internal network 912 are depicted in process 1804, whereas the steps for passing data from the internal network 912 to the external network 904 are depicted in process 1808.

In process 1804, a data packet is received from the external network 904 at act 1810. In act 1812 the data packet is parsed into an input request—for example a node function input—and output routing information—for example, information necessary to send a response back the data packet sender. In act 1816 the input request is formatted and sent to the controller.

In process 1808 data output (e.g., the node navigation tree 1900 ) is received at the packet engine 1800 from the internal network 912 at act 1824. In act 1828 data received from the internal network is formatted into acceptable data packet for routing over the external network. The output routing information parsed at step 1812 of process 1804 is used to this end. According to one embodiment an acceptable data packet is an IP packet in another embodiment an ATM packet is acceptable.

Remote Monitoring and Control

In the home entertainment system network 500 comprising the home gateway 504, it is possible to monitor and control nodes on the internal network 912 from the external network 904. In such an embodiment, the address mapping table 1600 facilitates communication between a device residing on the external network 904 and the node on the internal network 912.

The home gateway 504 (described above) preferably maintains the address mapping table 1600 and acts as a "gatekeeper" for inbound and outbound data from/to the external network 904. Furthermore, the home gateway 504 functions as a repository for information pertaining to the home entertainment system network 500, storing in memory (e.g.,. flash memory 716 or DRAM memory 720 ) node attribute information such as node type, compatibility, and additional ATM, MPEG, IEEE 1394 and IP service information. Service controller 808 handles much of the functionality described below.

In one embodiment, the home gateway 504 includes in the firmware stack 800 a SNMP (simple network management protocol) manager and agent. The SNMP agent responds to queries concerning the IEEE 1394 nodes in the home entertainment network system 500 and effectively provides the home gateway 504 the ability to respond to queries from other SNMP managers. The information queried by the SNMP managers is contained in a management information base ("MIB"), which is stored in the home gateway 504. One embodiment of a MIB is the address mapping table 1600, together with other tables such as the node functionality table 2100. In an alternative embodiment, another MIB, such as one defined by RFC 1213 is employed. SNMP is further described in Internet Architecture Board document RFC 1157, which is publicly available from Sun Microsystems—Suisse, Zurich, Switzerland.

Furthermore, the SNMP agent is capable of initiating tasks requested by particular IEEE 1394 nodes in the system 500. For example, the SNMP manager may receive a request for a bus reset. The request for the bus reset is passed to the SNMP agent, and the SNMP agent then causes the 1394 driver 820 to trigger the bus reset. Another example is receiving a command passed through a remote SNMP manager. The command, like the request described above, is passed to the SNMP agent and the SNMP agent processes the command and formats it for transmission to the subsequent layer—e.g., the 1394 driver 820, or the OS kernel 804.

In another embodiment, the home gateway 504 incorporates web-server functionality. More specifically, the home gateway 504 serves requests from outside clients, for example a web browser, and returns information about IEEE 1394 nodes in the home entertainment network system 500. For example, in one embodiment requests for the node navigation tree 1900 and responses returning the node navigation tree 1900 are handled by the web-server. Thus, the web-server includes functionality, such as that of the packet engine 1800 described above with reference to FIG. 15. The web-server functionality is substantially similar to the SNMP functionality but with the web-server, the monitoring and control is preferably controlled through a remote client such as a web browser. Commands from the outside client can also include a bus reset, a trigger to cause a VCR to start recording, or a switch to lock a door or turn out a light.

In either the web-server or SNMP manager embodiments, a central office or monitoring site, for example the VSP 648 or IAP/ISP 640 (described above with reference to FIG. 6), is capable of monitoring devices within the home entertainment network system 500.

Figure 23:
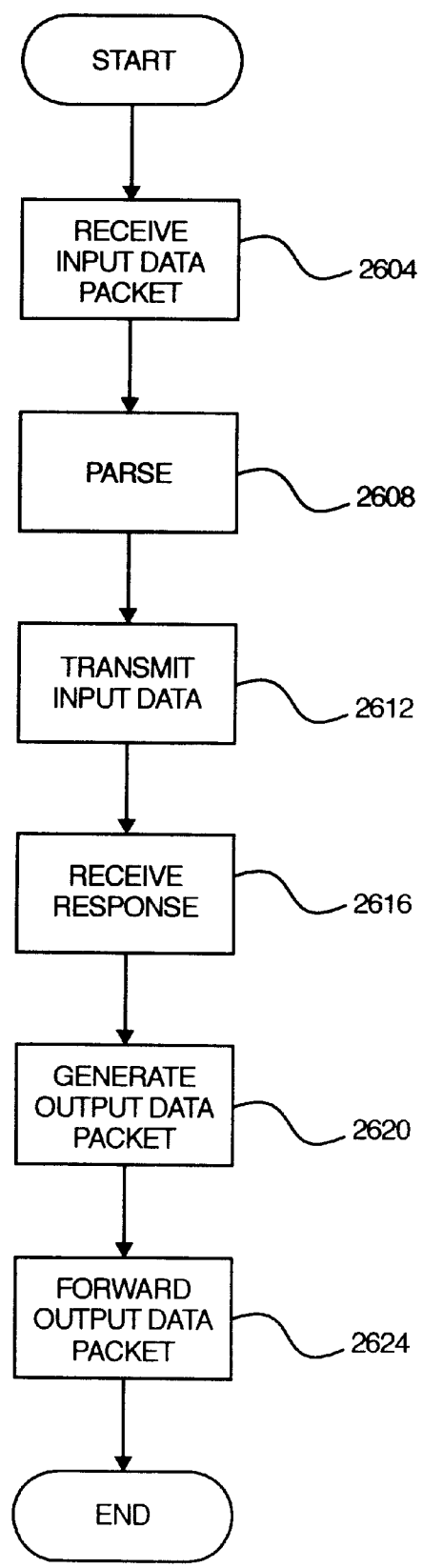
FIG. 23 is a flowchart depicting acts for performing remote monitoring and control.

The remote monitoring and control acts are depicted in FIG. 23. The acts are performed by the home gateway 504, and can be performed more particularly by the SNMP manager and agent, or the web-server component of the home gateway 504.

In act 2604, an output data packet is received at the home gateway 504. In act 2608, the output data packet is parsed. For example, a input data packet is separated from other header or meta data, which describes the remote client and information about the input data packet (e.g., security information, remote IP address, etc.) The input data packet is transmitted from the home gateway 504 to the target node in act 2612.

In act 2616, a response to the input data packet transmitted in act 2612 is received at the home gateway 504. An output data packet is generated in act 2620, and in act 2624, the output data packet is returned to the remote client that requested the information.

The address mapping table 1600 is highly useful in the remote monitoring and control aspects of the invention. For example, the address mapping table 1600 is used for act 2612 to assist in addressing the target IEEE 1394 node in the home entertainment network system 500 for which the request or command is directed. Similarly, the address mapping table 1600 can also be used to authenticate requests for data or commands from the remote client by including the IP address, or other address information (e.g., node unique ID) to verify authority of the remote client to request such data or commands. Furthermore, the IP service description (described above with reference to FIGS. 22A–C) is also useful in understanding the more general description of remote monitoring and control set forth above.

Geographic Data Collection

FIG. 24 depicts a block diagram of a hardware architecture of an IEEE 1394 home gateway node 2700 configured to collect geographic statistical data, together with a central server 2750 (e.g., a central office server or a head-end server). In a preferred embodiment, the home gateway 2700 is similar to home gateway 504, with only selected components of the home gateway 2700 shown for simplicity. The home gateway 2700 comprises a central processing unit 704, a persistent memory, such as non-volatile memory 2712, an external network interface 2704, such as ATM LSI 728 (not shown in FIG. 24—shown in FIG. 7), an internal network interface 2708, such as 1394 LINK LSI 736 (not shown in FIG. 24—shown in FIG. 7), and a positioning unit 2716. The non-volatile memory 2712 is communicatively coupled to the CPU 704 via a local bus 706, whereas the CPU 704, external network interface 2704 the internal network interface 2708 and the positioning unit 2716 are communicatively interconnected via PCI bus 724.

Central server 2750 is preferably an enterprise quality server, such as a Sun™ Enterprise™ 250 system, available from Sun Microsystems in Mountain View, Calif., running a client-server software system, such as an Oracle 8™ database, available from Oracle Corporation in Redwood Shores, Calif. Central server 2750 is operated by a service provider, such as a cable or video service provider and is located at a remote location relative to the home gateway 2700.

Central server 2750 is depicted in block diagram format as having a CPU 2754, a non-volatile memory 2758 (e.g., a persistent disk), and an external network interface 2762. The CPU 2754, the NV memory 2758 and the external network interface 2762 are communicatively coupled via a local bus 2756. The central server 2750 and the home gateway 2700 are communicatively coupled via a physical medium between the external network interfaces 2704 and 2762, such as fiber optic cable 2702. Other coupling mediums can include copper (twisted pair or coaxial) and wireless interfaces.

The positioning unit 2716, shown in home gateway 2700, can have multiple embodiments. For example, in one preferred embodiment, the positioning unit 2716 comprises a global positioning module such as the ACE II GPS™ module that is available from Trimble Navigation in Sunnyvale, Calif. However, a particular, or highly accurate global positioning module is not necessarily required, as the geographic resolution of the unit is not critical. By way of further example, geographic location data is to be requested by the central server 2750—e.g., from a cable provider—thereby triggering the global positioning module to update location information for the home gateway 2700. The positioning unit 2716 then provides the updated location information to the central server 2750—for example, directly from the positioning unit 2716 or via the CPU 704.

In an alternative, and more cost effective embodiment, a persistent memory, such as a non-volatile RAM, can be employed in the positioning unit 2716, together with a software based user prompt that is initialized during the home gateway 2700 power-up, or at a user's request. The user prompt directs a user to manually enter a geographic location identifier, such as a zip code, and the user response is recorded into the non-volatile RAM. When subsequent request for geographic location information for the home entertainment network system 500 are made, the home gateway 2700 can respond by returning the location identifier stored in the persistent memory.

FIG. 25 is a flowchart depicting a method for collecting statistical geographic location information in a network environment, such as the home entertainment network system 500. The method is preferably performed via a sequence of instructions—e.g., a firmware routine—executing in the home gateway 2700.

Referring to the first act depicted in FIG. 25, a test is performed by the home gateway 2700 at act 2804 to determine whether the location information stored in the positioning unit 2716 is current. Under normal circumstances, the test is performed on a regular, e.g., biweekly basis, so a counter/timer may be used to determine whether the geographic location information is current. Preferably the counter/timer is set to reflect an invalid time whenever a power off occurs, thereby forcing an update of the geographic location information. If the counter/timer is current, then the process continues to act 2816, otherwise, the process continues to act 2808.

In act 2808, the processing unit 2716 retrieves geographic location information either automatically (e.g., through a global positioning module), or manually (e.g., through a user prompt and response). In act 2812, the geographic location information is stored in a persistent memory in the home gateway 2700—e.g., NV memory 2712, or in a dedicated persistent memory (not shown) which is part of the positioning unit 2716.

In act 2816, incoming content information from the external network 904, which is passing through the external network interface 2704, is sampled. The sampled incoming data includes a channel identifier and can also include a broadcaster's time and date stamp. In act 2820, the sampled data is recorded in statistical data table 3000 (described in detail with reference to FIG. 27) residing in a persistent memory, e.g., NV memory 2712. In a preferred embodiment, each time a channel is changed on an IEEE 1394 node in the IEEE 1394 bus 568 for a period longer than a predetermined length of time, e.g., five minutes, the home gateway 2700 will create a corresponding record in the statistical data table 3000.

In act 2824, a test is performed to determine whether a request has been received for statistical geographic data. Generally, the statistical data request will come from the central server 2750 at a broadcaster's facility over the external network 904. However, the statistical data request can come from within the home entertainment network system 500, such as, for example, by a parent wishing to review a child's viewing habits.

If a statistical data request has not been received, then the present iteration of the process ends and the home gateway 2700 cycles back to act 2804. If, however, a statistical data request has been received by the home gateway 2700, then processing continues to act 2828, where the sampled data contained in the statistical data table 3000 is encrypted. According to an embodiment, a public key/private key encryption pair is used for the decryption/encryption mechanism, such as the Message Digest 5 "MD5" algorithm. The MD5 algorithm is described in the publicly available Internet RFC 1321, entitled, "The MD5 Message Digest Algorithm", R. Rivest, 1992, and which is incorporated herein by reference in its entirety.

After the information from the statistical data table is encrypted, it is transmitted, together with the location identifier (if needed), over the external network interface 2704 to the central server 2750 at act 2832. Notably, if only particular home gateways 2700 having a particular location identifier are polled at any given time, then it may not be necessary to include the location identifier. However, if periodic updates are pushed from the home gateway 2700 to the central server 2750, then the location identifier becomes necessary. Thereafter, the present iteration of the process terminates and a new cycle can begin again at act 2804.

FIG. 26 is a flowchart depicting a method for collecting statistical geographic information from a network environment by the central server 2750. The method is preferably performed via sequences of instructions—e.g., an application—running on the central server 2750. Beginning at act 2904, the central server 2750 initializes communication with the home gateway 2700.

According to one embodiment, the initialization sequence includes authenticating the identity of both the central server 2750 to the home gateway 2700, as well as the home gateway 2700 to the central server 2750. In another embodiment, the authentication process further includes registering additional IEEE 1394 nodes residing in the home entertainment network system 500. This can be performed by including selected data such as the node unique IDs from the address mapping table 1600 (described in detail with reference to FIGS. 13 and 19).

In yet another embodiment, when the geographic location information/identifier is recorded in the home gateway 2700 at act 2808 (FIG. 25), the location identifier is stored in both the address mapping table 1600 and within a reserved persistent memory location of each IEEE 1394 node residing on the IEEE 1394 bus 568 (when write access is allowed). When a bus reset occurs, discrepancies between the location identifiers, e.g., between any IEEE 1394 node and the home gateway 2700, detected by the home gateway 2700 or the central server 2750 triggers the authentication/registration process with the central server 2750. Alternatively, the home gateway 2700 can periodically synchronize a portion of its address mapping table 1600 with the central server 2750. The node unique ID of the particular IEEE 1394 node (which has a differing location identifier) and the node unique ID of the home gateway 2700 are then reconciled by the central server 2750. If, for some reason, the discrepancy cannot be reconciled, then appropriate service personal can be notified of either a potential user error or a stolen device.

After act 2904, the central server 2750 requests sampled statistical data, e.g., all or only a portion of the statistical data table 3000, from the home gateway 2700 in act 2908. After requesting the sampled statistical data, the central server 2750 will wait for a period of time for the sampled statistical data in act 2912. If no sampled statistical data is received, then processing continues to act 2904. However, if sampled statistical data is received, then processing continues to act 2916.

In act 2916, the sampled statistical data received from the home gateway 2700 is decrypted. Again, according to one embodiment, the encryption/decryption algorithm is the MD5 function described herein with reference to Internet RFC 1321.

In act 2920, the decrypted sampled statistical data is analyzed for viewing patterns and user preferences. Based upon the sampled statistical data, particular content, such as types of advertising or program listings, can be selectively broadcast to a user viewing content passing through the home gateway 2700. For example, if a user consistently watches a particular program or channel, then that program or channel may be thereafter marked as a "preferred" viewing channel in an electronic program guide. Similarly, demographics, e.g., age, sex or zip code of a particular user, or group of users who view a particular program, can also be recorded. Based upon the demographics of a particular program, advertising geared toward the particular user or group of users can be broadcast with the program, as well as enhanced viewing information, such as uniform resource locators, "URLs", related to the program and user preferences.

FIG. 27 is a diagram of an exemplary statistical data table 3000. The statistical data table 3000 has five columns, although it could have more or less columns in alternate embodiments. The node unique ID column 3004 stores a unique identifier for each IEEE 1394 device receiving content through the home gateway 2700 at a given instant. The channel column 3008 stores an identifier for the particular channel that is being piped through the home gateway 2700. A timestamp/counter field 3012, e.g., a 16-bit time and date stamp, for uniquely identifying a particular date and time for each record, stores the time viewing began for a particular user and channel. Similarly, the timestamp/counter field 3016 is used to record the data and time when viewing ended for the particular user and channel. The timestamp/counter data for fields 3008 and 3012 is preferably generated and broadcast by the central server 2750 so as a standard frame of reference is used when analyzing the statistical data Alternatively, the timestamp/counter can be generated by the home gateway 2700, however it should still be periodically synchronized with the central server 2750. User field 3020 records a user identifier for the particular statistic data record. For example, users knowing a password to disable parental control can be assigned a predetermined user identifier.

Three rows 3024, 3028, and 3032 are shown in the statistical data table 3000. For example, when analyzed by the central server 2750, the information stored in rows 3024 and 3028 communicates that User A watched channel "2" on a Mitsubishi TV for six minutes on a particular date and at a particular time. Furthermore, the records indicated that User A thereafter switched to channel "4", wherein they continued to watch for nine additional minutes. Row 3032 indicates to the central server 2750 that while User A was viewing channel "4", User B tuned in channel "2" on a different IEEE 1394 node (here on an ACME PC) for twenty-six minutes. The information in the statistical data table 3000 can be augmented with the address mapping table 1600 (described herein) to add depth to the data samples.

The methods and processes described herein are preferably performed by one or more processors executing one or more sequence of instructions stored on a computer-readable medium, such as a persistent disk, a CD-ROM, a floppy disk, a volatile memory (e.g., random access memory "RAM"), or a non-volatile memory (such as a flash memory or read-only memory "ROM"), rather than in a particular hardware arrangement. However, in the broader spirit of the inventions, various aspects of the methods and processes described herein can be implemented via hardware components such as TTL logic, or gate arrays. Furthermore, if a preference for a firmware level, e.g., a lower level programmic implementation of software component that is, generally, stored in ROM, or an application level, e.g., a higher level programmic implementation of a software component that runs over firmware, an operating system kernel, and/or server processes, software component is desired, then that preference is specified. If no preference is specified, then either level of implementation is acceptable. Accordingly, the written description and accompanying figures contained herein are to be regarded in an illustrative, rather than a restrictive sense.

What is claimed is:

1. A method for remote monitoring and control in a network system comprising an IEEE 1394 bus and including a gateway device bridging the network system to an external network, comprising:

resetting the IEEE 1394 bus;

polling particular local nodes in the internal network;

gathering addresses and associated attributes from the local nodes;

storing the addresses and attributes in a memory;

receiving an input data packet from the external network at the gateway device, the input data packet including input data related to a request made by the external network to monitor and control a particular local node on the network system;

separating the input data packet into an output request and input data;

mapping the input data to the particular local node;

transmitting the input data to the particular local node;

receiving a response from the particular local node;

generating an output data packet comprising the response from the particular local node; and forwarding the output data packet to the external network to satisfy the output request to monitor and control the particular local node.

2. The method of claim 1 wherein the external network comprises a packet data network.

3. The method of claim 1 wherein the external network comprises an asynchronous transfer mode network.

4. The method of claim 1 wherein addresses of the external network use a different protocol than the addresses of the internal network, further comprising:

mapping between the addresses of the external network and node addresses of the internal network in the gateway device.

5. The method of claim 1, wherein the memory is located in the gateway device.

6. The method of claim 1, wherein the network system comprises a home entertainment system and the gateway device is a home gateway.

7. The method of claim 1 wherein the node attributes include ATM, MPEG, IEEE 1394 and IP service information.

8. The method of claim 1 wherein input packets are received from the remote node over a virtual circuit, further comprising:

maintaining a virtual channel identifier and a virtual path identifier for each local node.

9. The method of claim 8 wherein the virtual circuit is a permanent virtual circuit.

* * * * *